US012539603B2

(12) United States Patent
Itou et al.

(10) Patent No.: US 12,539,603 B2
(45) Date of Patent: Feb. 3, 2026

(54) CONTROL DEVICE, CONTROL METHOD, AND STORAGE MEDIUM

(71) Applicant: NEC Corporation, Tokyo (JP)

(72) Inventors: Takehiro Itou, Tokyo (JP); Hisaya Wakayama, Tokyo (JP); Masatsugu Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 121 days.

(21) Appl. No.: 18/554,925

(22) PCT Filed: Apr. 23, 2021

(86) PCT No.: PCT/JP2021/016474
§ 371 (c)(1),
(2) Date: Oct. 11, 2023

(87) PCT Pub. No.: WO2022/224447
PCT Pub. Date: Oct. 27, 2022

(65) Prior Publication Data
US 2024/0208047 A1 Jun. 27, 2024

(51) Int. Cl.
*B25J 9/16* (2006.01)
*B25J 13/08* (2006.01)
(Continued)

(52) U.S. Cl.
CPC ........... *B25J 9/1602* (2013.01); *B25J 9/1697* (2013.01); *B25J 13/08* (2013.01); *G06T 19/006* (2013.01);
(Continued)

(58) Field of Classification Search
CPC ........ B25J 9/1602; B25J 9/1697; B25J 13/08; G06T 19/006; G06T 19/20;
(Continued)

(56) References Cited

U.S. PATENT DOCUMENTS 10,192,115 B1 * 1/2019 Sheffield ............. G06F 16/9537
11,151,737 B1 * 10/2021 Li ............................ G06T 7/55
(Continued)

FOREIGN PATENT DOCUMENTS

JP H03-55194 A 3/1991
JP 2010-211746 A 9/2010
(Continued)

OTHER PUBLICATIONS

International Search Report for PCT Application No. PCT/JP2021/016474, mailed on Jun. 29, 2021.
(Continued)

*Primary Examiner* — Sohana Tanju Khayer
(74) *Attorney, Agent, or Firm* — Sughrue Mion, PLLC

(57) ABSTRACT

A control device 1X mainly includes a recognition result acquisition means 14X, a display control means 15X, and a correction receiving means 16X. The recognition result acquisition means 14X acquires a recognition result of an object relating to a task to be executed by a robot. The display control means 15X displays information representing the recognition result to be visually recognized in a state where the information overlaps with an actual scene or an image of the scene. Then, the correction receiving means 16X receives a correction of the recognition result based on an external input.

14 Claims, 21 Drawing Sheets

(51) Int. Cl.
  *G06T 19/00* (2011.01)
  *G06T 19/20* (2011.01)
  *G06V 10/98* (2022.01)
  *G06V 20/52* (2022.01)
(52) U.S. Cl.
  CPC .......... *G06T 19/20* (2013.01); *G06V 10/987* (2022.01); *G06V 20/52* (2022.01); *G06T 2219/2004* (2013.01)
(58) Field of Classification Search
  CPC .......... G06T 2219/2004; G06V 10/987; G06V 20/52; G06V 20/20
  See application file for complete search history.

(56) References Cited

U.S. PATENT DOCUMENTS

| | | | |
|---|---|---|---|
| 11,200,742 B1* | 12/2021 | Post | G06T 19/003 |
| 11,803,698 B2* | 10/2023 | Pestoni | G06F 40/169 |
| 12,002,457 B1* | 6/2024 | Heitzman | G10L 15/22 |
| 2010/0232647 A1 | 9/2010 | Fujieda et al. | |
| 2014/0019975 A1* | 1/2014 | Schmidt | G06F 9/453 |
| | | | 718/100 |
| 2014/0200714 A1 | 7/2014 | Kawamoto et al. | |
| 2014/0304104 A1* | 10/2014 | Ladue | G06Q 30/0631 |
| | | | 705/26.7 |
| 2015/0262370 A1 | 9/2015 | Minato et al. | |
| 2016/0064002 A1* | 3/2016 | Kim | G01S 3/8083 |
| | | | 704/246 |
| 2017/0132752 A1 | 5/2017 | Aoyanagi et al. | |
| 2018/0079081 A1* | 3/2018 | Chen | B25J 9/0003 |
| 2018/0307303 A1* | 10/2018 | Powderly | G06F 3/017 |
| 2019/0060001 A1* | 2/2019 | Kohli | A61B 34/20 |
| 2019/0147221 A1* | 5/2019 | Grabner | G06T 7/75 |
| | | | 382/103 |
| 2019/0371028 A1* | 12/2019 | Harrises | G02B 27/0172 |
| 2019/0384414 A1* | 12/2019 | Woo | G06V 40/174 |
| 2020/0101611 A1* | 4/2020 | Ramanujam | G05B 17/02 |
| 2020/0114515 A1* | 4/2020 | Thackston | B25J 9/1664 |
| 2020/0156236 A1* | 5/2020 | Lager | B25J 9/163 |
| 2020/0175384 A1* | 6/2020 | Zhang | G06N 3/088 |
| 2020/0265233 A1* | 8/2020 | Jeong | G06T 7/60 |
| 2020/0278756 A1* | 9/2020 | Holz | G06F 3/011 |
| 2020/0333789 A1* | 10/2020 | Suzuki | G05D 1/0212 |
| 2021/0162600 A1* | 6/2021 | Clever | B25J 9/1605 |
| 2021/0223774 A1* | 7/2021 | Zhang | G05D 1/0088 |
| 2021/0334696 A1* | 10/2021 | Traut | G06N 20/00 |
| 2021/0341504 A1* | 11/2021 | Nalam Venkat | G01N 15/05 |
| 2022/0035514 A1* | 2/2022 | Shin | G06V 10/764 |
| 2022/0055217 A1* | 2/2022 | Buerger | G05B 19/41815 |
| 2022/0105637 A1* | 4/2022 | Schillinger | B25J 9/0084 |
| 2022/0309767 A1* | 9/2022 | Keefe | G06T 7/277 |
| 2023/0260220 A1* | 8/2023 | Ishihara | G09G 5/026 |
| | | | 345/633 |

FOREIGN PATENT DOCUMENTS

| | | |
|---|---|---|
| JP | 2013-031896 A | 2/2013 |
| JP | 2015-176272 A | 10/2015 |
| JP | 2017-091078 A | 5/2017 |
| JP | 2020-046779 A | 3/2020 |
| WO | 2017/098561 A1 | 6/2017 |

OTHER PUBLICATIONS

Katayama et al. "Fast LTL-Based Flexible Planning for Dual-Arm Manipulation", 2020 IEEE/RSJ International conference on Intelligent Robots and systems (IROS 2020), pp. 6605-6612, Oct. 25-29, 2020, Las Vegas, NV. USA.

* cited by examiner

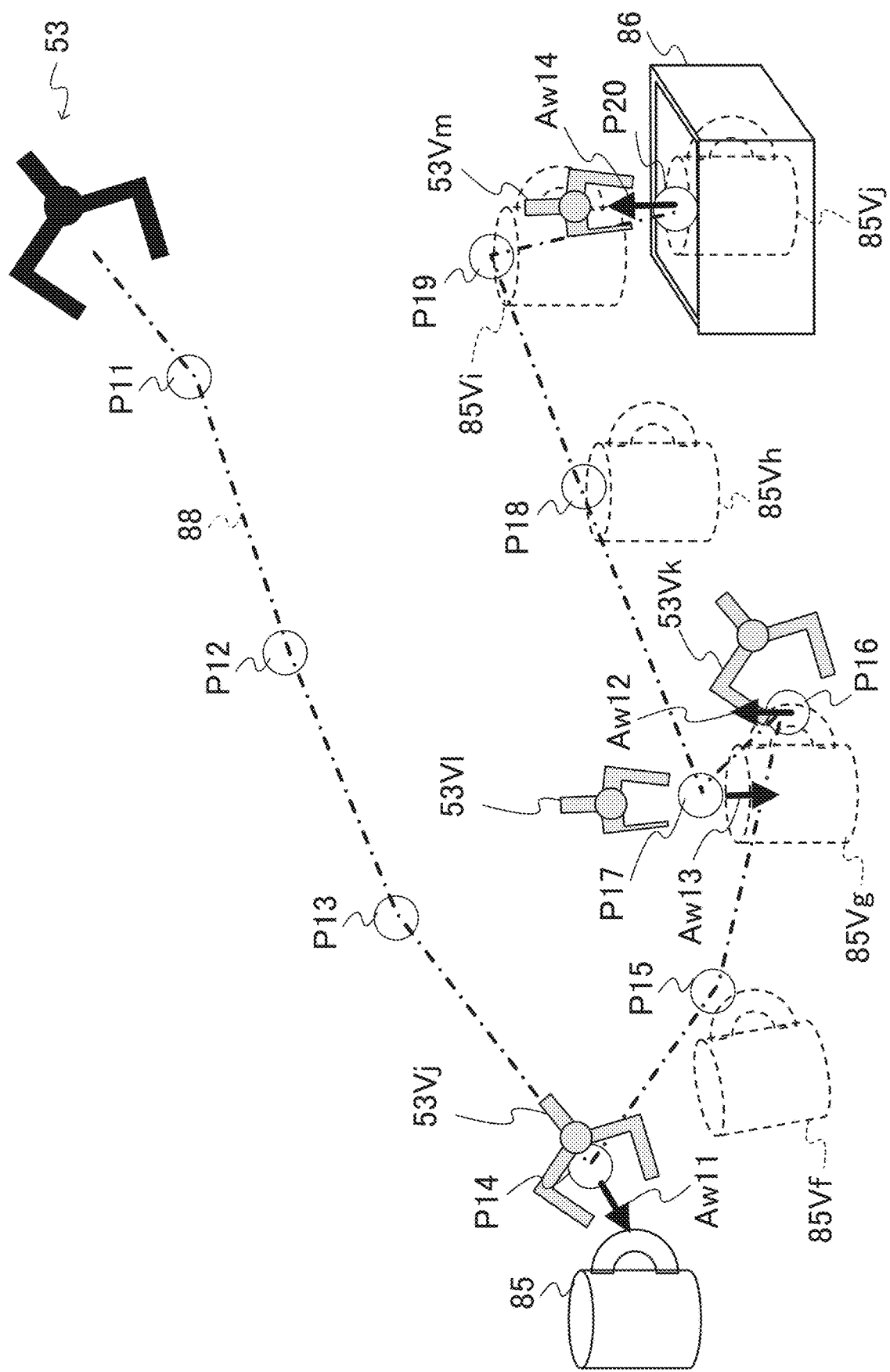

CONTROL DEVICE, CONTROL METHOD, AND STORAGE MEDIUM

This application is a National Stage Entry of PCT/JP2021/016474 filed on Apr. 23, 2021, the contents of all of which are incorporated herein by reference, in their entirety.

TECHNICAL FIELD

The present disclosure relates to the technical field of a control device, a control method, and a storage medium for a robot which performs tasks.

BACKGROUND

There is proposed a robot system which recognizes the robot environment by sensors and operate the robot to execute the task based on the recognized environment. For example, Patent Literature 1 discloses a robot system configured to command the robot to operate based on the detection result from ambient environment detection sensors and the determined operation plan of the robot.

CITATION LIST

Patent Literature

Patent Literature 1: JP2020-046779A

SUMMARY

Problem to be Solved

If there is an error in the recognition of the robot environment, the determined robot's operation (motion) plan may not be correctly executed. On the other hand, it is difficult in some cases to recognize the robot environment with perfect accuracy based on the output signal from the sensors.

In view of the above-described issue, it is therefore an example object of the present disclosure to provide a control device, a control method, and a storage medium capable of suitably acquiring an accurate recognition result of an object relating to a task.

Means for Solving the Problem

In one mode of the control device, there is provided a control device including:
  a recognition result acquisition means configured to acquire a recognition result of an object relating to a task to be executed by a robot;
  a display control means configured to display information representing the recognition result to be visually recognized in a state where the information overlaps with an actual scene or an image of the scene; and
  a correction receiving means configured to receive a correction of the recognition result based on an external input.

In one mode of the control method, there is provided a control method executed by a computer, the control method including:
  acquiring a recognition result of an object relating to a task to be executed by a robot;
  displaying information representing the recognition result to be visually recognized in a state where the information overlaps with an actual scene or an image of the scene; and
  receiving a correction of the recognition result based on an external input.

In one mode of the storage medium, there is provided a storage medium storing a program executed by a computer, the program causing the computer to:
  acquire a recognition result of an object relating to a task to be executed by a robot;
  display information representing the recognition result to be visually recognized in a state where the information overlaps with an actual scene or an image of the scene; and
  receive a correction of the recognition result based on an external input.

Effect

An example advantage according to the present invention is to suitably acquire an accurate recognition result of an object relating to a task.

BRIEF DESCRIPTION OF THE DRAWINGS

FIG. 13 It schematically shows, in the first specific example, modified trajectories of the robot hand and the target object modified based on the input of correcting the trajectories of the robot hand and the target object.

EXAMPLE EMBODIMENTS

Hereinafter, example embodiments regarding a control device, a control method, and a storage medium will be described with reference to the drawings.

First Example Embodiment (1) System Configuration

Figure 1:
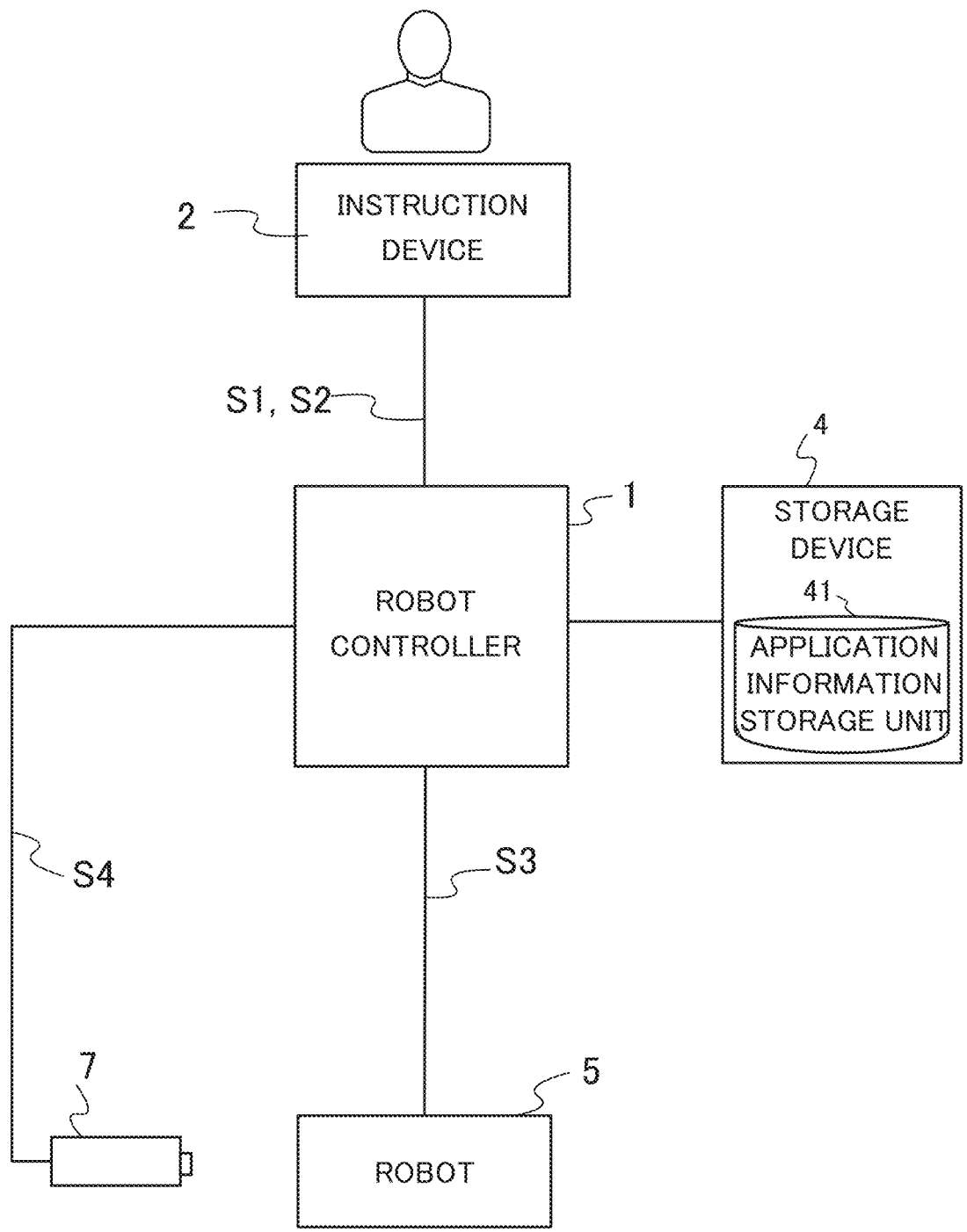
FIG. 1 It shows a configuration of a robot control system in the first example embodiment.

FIG. 1 shows a configuration of a robot control system 100 according to the first example embodiment. The robot control system 100 mainly includes a robot controller 1, an instruction device 2, a storage device 4, a robot 5, and a sensor (detection device) 7.

When a task (also referred to as "objective task") to be executed by the robot 5 is designated, the robot controller 1 converts the objective task into a time step sequence of tasks each of which is a simple task that the robot 5 can accept, and controls the robot 5 based on the generated sequence.

In addition, the robot controller 1 performs data communication with the instruction device 2, the storage device 4, the robot 5, and the sensor 7 through a communication network or by wireless or wired direct communication. For example, the robot controller 1 receives an input signal "S1" relating to the operation plan of the robot 5 from the instruction device 2. Further, the robot controller 1 causes the instruction device 2 to perform a predetermined display or audio output by transmitting a display control signal "S2" to the instruction device 2. Furthermore, the robot controller 1 transmits a control signal "S3" relating to the control of the robot 5 to the robot 5. The robot controller 1 also receives the sensor signal "S4" from the sensor 7.

The instruction device 2 is a device configured to receive an instruction relating to the operation plan of the robot 5 by the operator. The instruction device 2 performs a predetermined display or audio output based on the display control signal S2 supplied from the robot controller 1, or supplies an input signal S1 generated based on the operator's input to the robot controller 1. The instruction device 2 may be a tablet terminal equipped with an input unit and a display unit, or may be a stationary personal computer, or may be any terminal used for augmentation reality.

The storage device 4 includes an application information storage unit 41. The application information storage unit 41 stores application information necessary for generating an operation sequence, which is a sequence of operations to be executed by the robot 5, from the objective task. Details of the application information will be described later with reference to FIG. 3. The storage device 4 may be an external storage device, such as a hard disk, connected or embedded in the robot controller 1, or may be a storage medium, such as a flash memory. The storage device 4 may be a server device that performs data communication with the robot controller 1 via a communication network. In this case, the storage device 4 may be configured by a plurality of server devices.

The robot 5 performs a work related to the objective task on the basis of control signal S3 supplied from the robot controller 1. The robot 5 is, for example, a robot that performs an operation in an assembly factory, a food factory or any other factory or in logistics sites. The robot 5 may be a vertical articulated robot, a horizontal articulated robot, or any other type of a robot. The robot 5 may supply a state signal indicating the state of the robot 5 to the robot controller 1. The state signal may be an output signal from one or more sensors for detecting the state (e.g., position and angle) of the entire robot 5 or specific parts such as a joint, or may be a signal indicating the progress of the operation sequence of the robot 5 generated by a control unit of the robot 5.

The sensor 7 is one or more sensors to detect a state of the workspace in which the objective task is performed such as a camera, a range sensor, a sonar and any combination thereof. For example, the sensor 7 includes at least one camera for imaging the workspace of the robot 5. The sensor 7 supplies the generated sensor signal S4 to the robot controller 1. The sensor 7 may be a self-propelled or flying sensor (including a drone) that moves in the workspace. The sensors 7 may also include one or more sensors provided on the robot 5, one or more sensors provided on other objects existing in the workspace, and the like. The sensor 7 may also include a sensor that detects sound in the workspace. As such, the sensor 7 may include a variety of sensors that detect the state of the workspace, and may include sensors provided at any location.

The configuration of the robot control system 100 shown in FIG. 1 is an example, and various changes may be made to the configuration. For example, there may be plural robots 5, or each robot may have plural control targets to operate independently. Even in these cases, the robot controller 1 generates an operation sequence to be executed for each robot 5 or for each control target based on the objective task, and transmits the control signal S3 based on the operation sequence to the robot 5. Further, the robot 5 may perform cooperative work with other robots, workers, or machine tools that operate in the workspace. The sensor 7 may also be a part of the robot 5. The instruction device 2 may be configured as a single device integrated with the robot controller 1. Further, the robot controller 1 may be configured by a plurality of devices. In this case, the plurality of devices constituting the robot controller 1 exchange information necessary to execute the processing assigned in advance, among this plurality of devices. Further, the robot controller 1 and the robot 5 may be integrally configured.

(2) Hardware Configuration

Figure 2A:
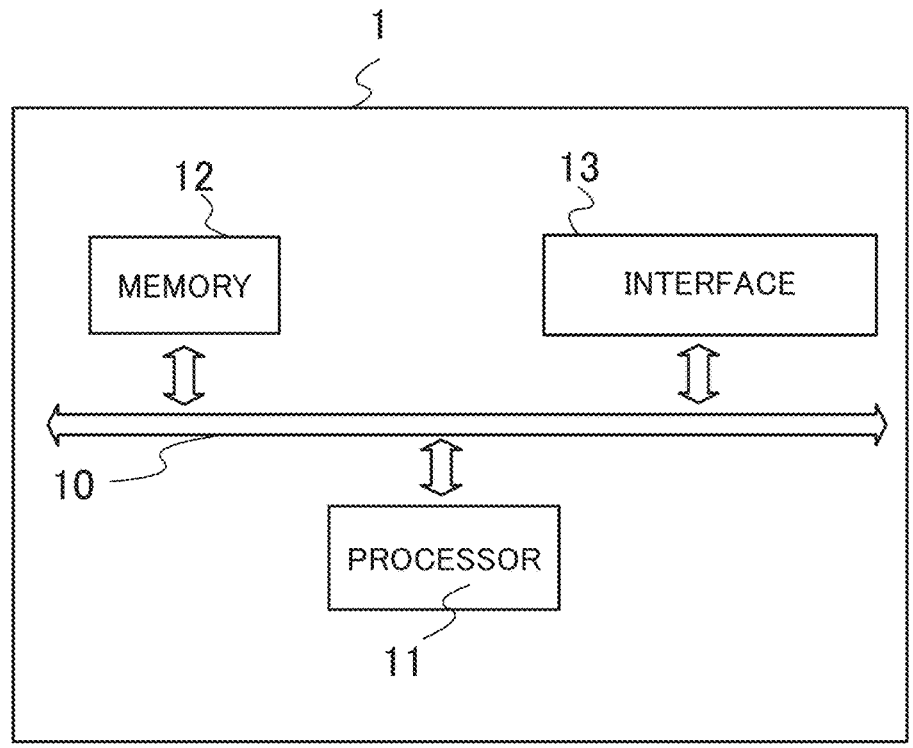
FIG. 2A shows the hardware configuration of the robot controller.

FIG. 2A shows a hardware configuration of the robot controller 1. The robot controller 1 includes a processor 11, a memory 12, and an interface 13 as hardware. The processor 11, memory 12 and interface 13 are connected to one another via a data bus 10.

The processor 11 executes a program stored in the memory 12 to function as a controller (arithmetic unit) for performing overall control of the robot controller 1.

Examples of the processor 11 include a CPU (Central Processing Unit), a GPU (Graphics Processing Unit), and a TPU (Tensor Processing Unit). The processor 11 may be configured by a plurality of processors. The processor 11 is an example of a computer.

The memory 12 is configured by a variety of volatile and non-volatile memories, such as a RAM (Random Access Memory), a ROM (Read Only Memory), and a flash memory. Further, in the memory 12, a program for executing a process executed by the robot controller 1 is stored. A part of the information stored in the memory 12 may be stored in one or a plurality of external storage devices (e.g., the storage device 4) capable of communicating with the robot controller 1, or may be stored in a storage medium detachable from the robot controller 1.

The interface 13 is one or more interfaces for electrically connecting the robot controller 1 to other devices. Examples of these interfaces include a wireless interface, such as a network adapter, for transmitting and receiving data to and from other devices wirelessly, and a hardware interface, such as a cable, for connecting to other devices.

The hardware configuration of the robot controller 1 is not limited to the configuration shown in FIG. 2A. For example, the robot controller 1 may be connected to or incorporate at least one of a display device, an input device, and/or an audio output device. The robot controller 1 may be configured to include at least one of the instruction device 2 and/or the storage device 4.

Figure 2B:
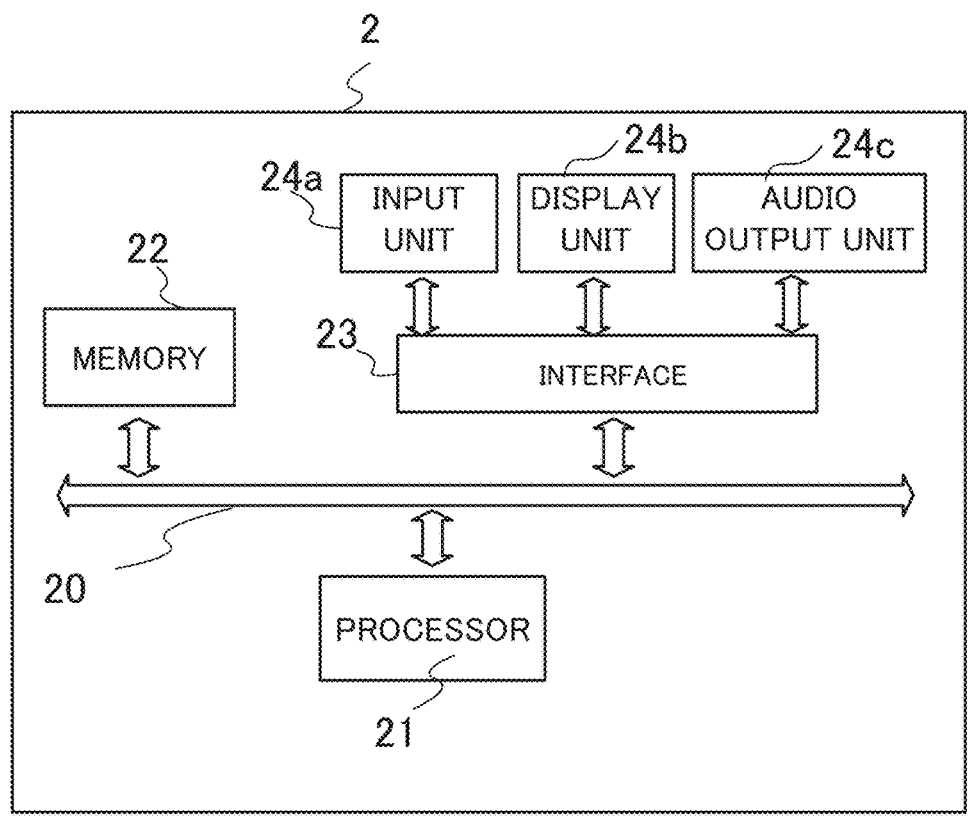
FIG. 2B shows the hardware configuration of the instruction device.

FIG. 2B shows the hardware configuration of the instruction device 2. The instruction device 2 includes, as hardware, a processor 21, a memory 22, an interface 23, an input unit 24a, a display unit 24b, and an audio output unit 24c. The processor 21, memory 22 and interface 23 are connected to one another via a data bus 20. Further, the interface 23 is connected to the input unit 24a and the display unit 24b and the audio output unit 24c.

The processor 21 executes a predetermined process by executing a program stored in the memory 22. The processor 21 is a processor such as a CPU and a GPU. The processor 21 receives the signal generated by the input unit 24a via the interface 23, and generates an input signal S1 to transmit the input signal S1 to the robot controller 1 via the interface 23. Further, the processor 21 controls at least one of the display unit 24b and/or the audio output unit 24c, based on the display control signal S2 received from the robot controller 1 via the interface 23.

The memory 22 is configured by various volatile and non-volatile memories such as a RAM, a ROM, a flash memory, and the like. Further, in the memory 22, a program for executing a process to be executed by the instruction device 2 is stored.

The interface 23 is one or more interfaces for electrically connecting the instruction device 2 to other devices. Examples of these interfaces include a wireless interface, such as a network adapter, for transmitting and receiving data to and from other devices wirelessly, and a hardware interface, such as a cable, for connecting to other devices. Further, the interface 23 performs interface operation of the input unit 24a, the display unit 24b, and the audio output unit 24c.

The input unit 24a is one or more interfaces that receive input from a user, and examples of the input unit 24a include a touch panel, a button, a keyboard, and a voice input device. The input unit 24a may also include various input devices (e.g., operating controllers) used in virtual reality. In this case, examples of the input unit 24a include various sensors used in motion-capture and the like (e.g., cameras and wearable sensors), and when the display unit 24b is an eyeglass-type terminal for realizing augmented reality, the input unit 24a may be an operating controller paired with the terminal.

The display unit 24b displays an augmented reality under the control of the processor 21. In the first example, the display unit 24b is a glasses-type terminal that displays information regarding the state of object(s) in the scene (in this case, the workspace) that is visually recognized by the operator while superimposing the information on the scene. In the second example, the display unit 24b is a display; a projector, or the like, which superimposes information regarding the object(s) on the image (also referred to as "live image") of the photographed scene (the workspace). The live image described above is supplied by the sensor 7. Examples of the audio output unit 24c include a speaker, and it performs audio output under the control of the processor 21.

The hardware configuration of the instruction device 2 is not limited to the configuration shown in FIG. 2B. For example, at least one of the input unit 24a, the display unit 24b, and/or the audio output unit 24c may be configured as a separate device that electrically connects to the instruction device 2. The instruction device 2 may also be connected to various devices such as a camera, and may incorporate them.

(3) Application Information

Next, a data structure of the application information stored in the application information storage unit 41 will be described.

Figure 3:
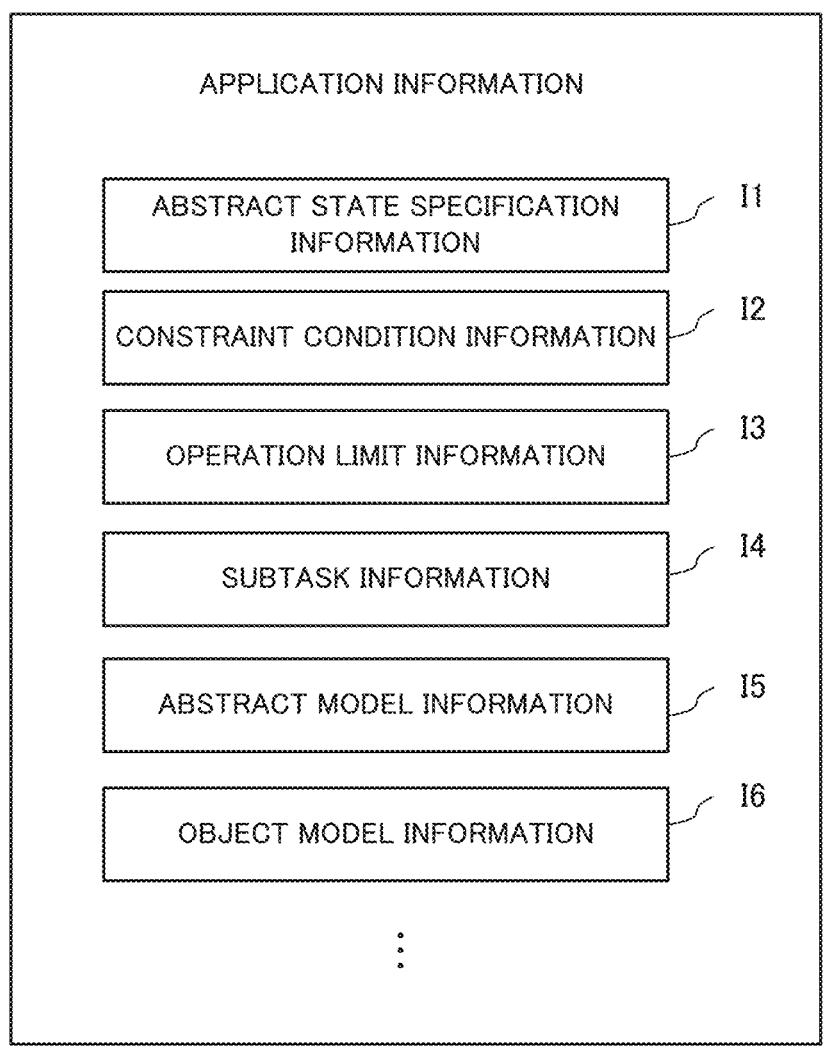
FIG. 3 It shows an example of the data structure of application information.

FIG. 3 shows an example of the data structure of the application information. As shown in FIG. 3, the application information includes abstract state specification information I1, constraint condition information I2, operation limit information I3, subtask information I4, abstract model information I5, and object model information I6.

The abstract state specification information I1 specifies abstract states to be defined in order to generate the subtask sequence. The above-mentioned abstract states are abstract states of objects existing in the workspace, and are defined as propositions to be used in the target logical formula to be described later. For example, the abstract state specification information I1 specifies the abstract states to be defined for each type of objective task.

The constraint condition information I2 indicates constraint conditions of performing the objective task. The constraint condition information I2 indicates, for example, a constraint that the robot 5 (robot arms) must not be in contact with an obstacle when the objective task is pick-and-place, and a constraint that the robot 5 (robot arms) must not be in contact with each other, and the like. The constraint condition information I2 may be information in which the constraint conditions suitable for each type of the objective task are recorded.

The operation limit information I3 is information on the operation limit of the robot 5 to be controlled by the robot controller 1. For example, the operation limit information I3 is information on the upper limit of the speed, acceleration, or the angular velocity of the robot 5. The operation limit information I3 may be information defining the operation limit for each movable portion or joint of the robot 5.

The subtask information I4 indicates information on subtasks is a possible component of the operation sequence. The term "subtask" indicates a task into which the objective task is resolved (broken down) in units which can be accepted by the robot 5 and indicates a segment operation of the robot 5. For example, when the objective task is pick-and-place, the subtask information I4 defines a subtask "reaching" that is the movement of the robot arm 52, and a subtask "grasping" that is the grasping by the robot arm 52. The subtask information I4 may indicate information on subtasks that can be used for each type of objective task. It is noted that the subtask information I4 includes information on subtasks (external input specific subtasks) which require operation commands by external input. In this case, the subtask information I4 relating to an external input specific subtask includes, for example, identification information (e.g., flag information) indicative of being an external input specific subtask and information indicative of the content of the operation to be performed by the robot 5 as the external input specific subtask.

The abstract model information I5 is information on an abstract model in which the dynamics in the workspace is abstracted. The abstract model is represented by a model in which real dynamics is abstracted by a hybrid system, as will be described later. The abstract model Information I5 includes information indicative of the switching conditions of the dynamics in the above-mentioned hybrid system. Examples of the switching conditions in the case of a pick-and-place, which requires the robot 5 to pick-up and move an object (referred to as "target object") to be worked on by the robot 5 to a predetermined position, include a condition that the target object cannot be moved unless it is gripped by the robot 5. The abstract model information I5 includes information on an abstract model suitable for each type of the objective task.

The object model information I6 is information relating to an object model of each object existing in the workspace to be recognized from the sensor signal S4 generated by the sensor 7. Examples of the above-mentioned each object include the robot 5, an obstacle, a tool or any other target object handled by the robot 5, a working object other than the robot 5, and the like. For example, the object model information I6 includes: information which is necessary for the robot controller to recognize the type, the position, the posture, the ongoing (currently-executing) operation and the like of the above-described each object: and three-dimensional shape information such as CAD (Computer Aided Design) data for recognizing the three-dimensional shape of the each object. The former information includes the parameters of an inference engine obtained by training a machine-learning model that is used in a machine learning such as a neural network. For example, the above-mentioned inference engine is learned in advance to output the type, the position, the posture, and the like of an object shown in the image when an image is inputted thereto.

In addition to the information described above, the application information storage unit 41 may store various information relating to the generation process of the operation sequence and the generation process of the display control signal S2.

(4) Process Overview

Next, a description will be given of an overview of the process executed by the robot controller 1 in the first example embodiment. Schematically: the robot controller 1 displays the recognition result of the objects in the workspace recognized on the basis of the sensor signal S4 on the instruction device 2 by augmented reality, and receives a correction input regarding the recognition result. Thus, even when an erroneous recognition on an object in the workspace occurs, the robot controller 1 appropriately corrects the erroneous recognition result based on the user input, and realizes the establishment of an accurate operation plan of the robot 5 and the execution of the objective task.

Figure 4:
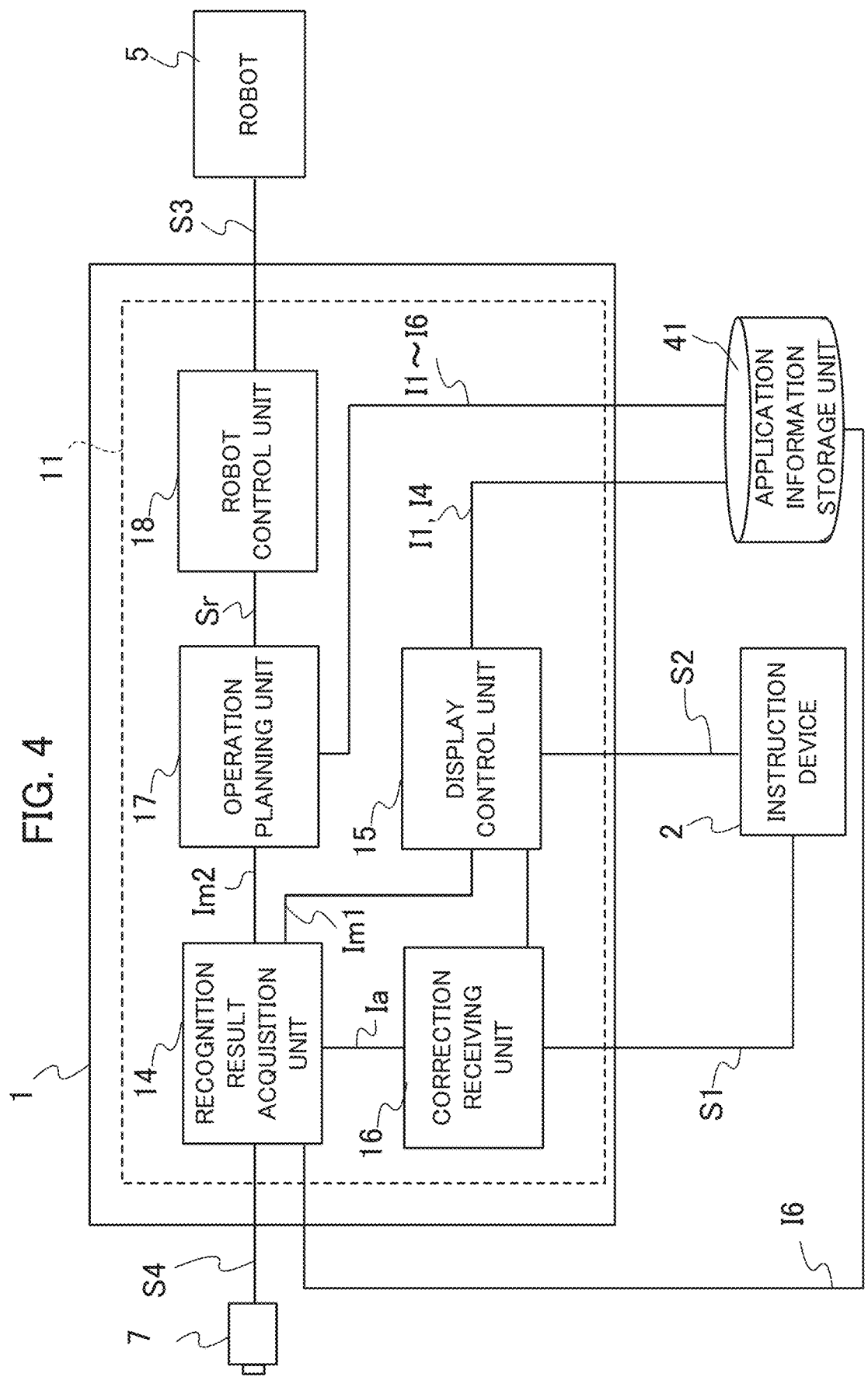
FIG. 4 It shows an example of functional blocks of the robot controller.

FIG. 4 is an example of a functional block showing an outline of the processing by the robot controller 1. The processor 11 of the robot controller 1 functionally includes a recognition result acquisition unit 14, a display control unit 15, a correction receiving unit 16, an operation planning unit 17, and a robot control unit 18. In FIG. 4, although an example of data to be transferred among the blocks is shown, it is not limited thereto. The same applies to the drawings of other functional blocks described below:

The recognition result acquisition unit 14 recognizes the state and the attribute of each object in the workspace on the basis of the sensor signal S4 or the like and supplies information (also referred to as "first recognition result Im1") representing the recognition result to the display control unit 15. In this case, for example, the recognition result acquisition unit 14 refers to the abstract state specification information I1 and recognizes the state and attribute of each object in the workspace that must be considered when executing the objective task. Examples of the objects in the workspace include the robot 5, a target object, such as a tool and a part, handled by the robot 5, an obstacle, and any other working body (a person or other object performing a work other than the robot 5). For example, the recognition result acquisition unit 14 generates the first recognition result Im1 by referring to the object model information I6 and analyzing the sensor signal S4 by any technique for recognizing the environment of a workspace. Examples of the techniques for recognizing environment include image processing techniques, image recognition techniques (including object recognition using AR markers), speech recognition techniques, and techniques using RFID (Radio Frequency Identifier).

In the present example embodiment, the recognition result acquisition unit 14 recognizes at least the position, the posture, and the attribute of each object. The attribute is, for example, a type of object, and the type of object recognized by the recognition result acquisition unit 14 is classified according to the classification granularity in accordance with the type of the objective task to be executed. For example, when the objective task is pick-and-place, each object is classified into "obstacle". "object to be grasped" or the like. The recognition result acquisition unit 14 supplies the generated first recognition result Im1 to the display control unit 15. The first recognition result Im1 is not limited to information representing the position, the posture, and the type of each object, but may include information regarding various states or attributes (e.g., the size, the shape, or the like of the object) recognized by the recognition result acquisition unit 14.

If the recognition result acquisition unit 14 receives the recognition correction information "Ia" indicating the correction details of the first recognition result Im1 from the correction receiving unit 16, the recognition result acquisition unit 14 generates information (also referred to as "second recognition result Im2") obtained by reflecting the recognition correction information Ia in the first recognition result Im1. For example, the recognition correction information Ia is information indicating: the necessity of the correction: a target object of the correction if the correction is necessary: an index to be corrected: and amount of the correction. The term "target object of the correction" herein indicates an object whose recognition result needs correction. Examples of the "index to be corrected" include an index relating to the position (e.g., coordinate value for each coordinate axis), an index relating to the posture (e.g., Eulerian angles), and an index representing the attribute. The recognition result acquisition unit 14 supplies the second recognition result Im2, to which the recognition correction information Ia is applied, to the operation planning unit 17. If the recognition correction information Ia indicates that there is no correction, the second recognition result Im2 becomes identical to the first recognition result Im1 firstly generated by the recognition result acquisition unit 14 based on the sensor signal S4.

The display control unit 15 generates a display control signal S2 for causing the instruction device 2 used by the operator to display or output, by audio, predetermined information, and transmits the display control signal S2 to the instruction device 2 via the interface 13. In the present example embodiment, the display control unit 15 generates an object (also referred to as "virtual object") virtually representing each object based on the recognition result of the each object in the workspace indicated by the first recognition result Im1. Then, the display control unit 15 generates a display control S2 for controlling the display of the instruction device 2 such that each virtual object is visually recognized by the operator in a superimposed manner on each corresponding object in the real scene or the live image. For example, the display control unit 15 generates the virtual object on the basis of the type of the object indicated by the first recognition result Im1 and the three-dimensional shape information generated for each type of the object included in the object model information I6. In another example, the display control unit 15 generates a virtual object by combining primitive shapes (polygons registered in advance) according to the shape of the object indicated by the first recognition result Im1.

The correction receiving unit 16 receives a correction relating to the first recognition result Im1 based on user operation by the operator who uses the instruction device 2. When the user operation relating to the correction is completed, the correction receiving unit 16 generates the recognition correction information Ia indicating the correction details relating to the first recognition result Im1. In this instance, during the control of displaying the recognition result of the object by augmented reality, the correction receiving unit 16 receives the input signal S1 generated by the instruction device 2 through the interface 13, and supplies the recognition result acquisition unit 14 with the recognition correction information Ia generated based on the input signal S1. Prior to the confirmation of the correction, the correction receiving unit 16 supplies the display control unit 15 with an instruction signal of instructing the correction of the display position of the virtual object based on the input signal S1 supplied from the instruction device 2. Then, the display control unit 15 supplies the instruction device 2 with the display control signal S2 to which the correction based on the instruction signal has been applied. The instruction device 2 displays the virtual object in which the user operation by the operator is immediately reflected, accordingly.

The operation planning unit 17 determines the operation plan of the robot 5 based on the second recognition result Im2 supplied from the recognition result acquisition unit 14 and the application information stored in the storage device 4. In this instance, the operation planning unit 17 generates an operation sequence "Sr" which is a sequence (subtask sequence) of subtasks that the robot 5 should perform in order to achieve the objective task. The operation sequence Sr specifies a series of motions of the robots 5, and includes information indicating the order of execution and the timing of execution of respective subtasks. The operation planning unit 17 supplies the generated operation sequence Sr to the robot control unit 18.

The robot control unit 18 controls the operation of the robot 5 by supplying a control signal S3 to the robot 5 through the interface 13. Based on the operation sequence Sr supplied from the operation planning unit 17, the robot control unit 18 performs control for the robot 5 to execute the subtasks constituting the operation sequence Sr at the respective defined execution timings (time steps). Specifically, the robot control unit 18 transmits the control signal S3 to the robot 5 to perform position control, torque control, or the like of the joint of the robot 5 for implementing the operation sequence Sr.

The robot 5 may be equipped with the function corresponding to the robot control unit 18, in place of the robot controller 1. In this instance, the robot 5 operates based on the operation sequence Sr generated by the operation planning unit 17.

Here, for example, each component of the recognition result acquisition unit 14, the display control unit 15, the correction receiving unit 16, the operation planning unit 17, and the robot control unit 18 can be realized by the processor 11 executing a program. Additionally, the necessary programs may be recorded on any non-volatile storage medium and installed as necessary to realize each component. It should be noted that at least some of these components may be implemented by any combination of hardware, firmware, and software, or the like, without being limited to being implemented by software based on a program. At least some of these components may also be implemented by a user programmable integrated circuit such as a FPGA (Field-Programmable Gate Array) and a microcontroller. In this case, the integrated circuit may be used to realize a program functioning as the above components. At least some of the components may also be configured by an ASSP (Application Specific Standard Produce), an ASIC (Application Specific Integrated Circuit), or a quantum computer-controlled chip. Accordingly, each component may be implemented by any kind of hardware. The above is true for other example embodiments described later. Furthermore, each of these components may be implemented by the cooperation of a plurality of computers, for example, using cloud computing technology.

(5) Generation of Correction Information

Next, a specific description will be given of the method of generating the recognition correction information Ia under the control of the display control unit 15 and the correction receiving unit 16. The display control unit 15 displays the virtual object of an object on the instruction device 2 so as to be superimposed on the real object (actual object) in the scene or the live image that is visually recognized by the operator, based on the recognized position and posture of the object. If there is a difference between the real object and the virtual object in the scene or the live image, the correction receiving unit 16 receives a user operation of correcting the position and the posture of the virtual object so that they coincide with each other.

First, correction modes for correcting the individual virtual object of each object will be described. FIG. 5A to FIG. 5D shows the correction modes (first mode to fourth mode) in which the correction receiving unit 16 accepts the correction, respectively. In FIGS. 5A to 5D, the left side from the arrow indicates the appearance of the real object and the virtual object before correction, and the right side from the arrow indicates the appearance of the real object and the virtual object after the correction. Here, the real object which has a cylindrical shape is shown by solid line, and the virtual object is shown by dashed line.

Figure 5A:
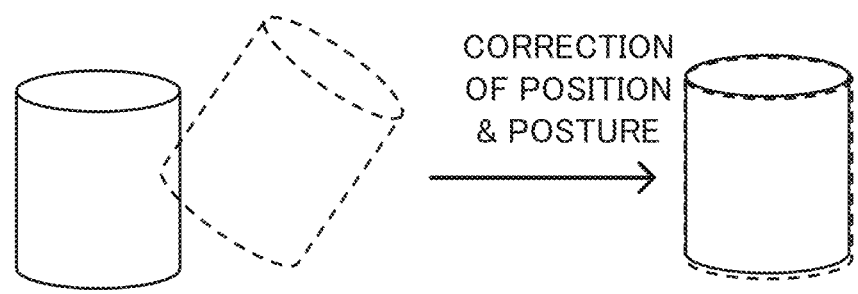
FIG. 5A shows a first mode of the correction.

According to the first mode shown in FIG. 5A, in the state before correction, the position and the posture of the virtual object is visually recognized to deviate from the position and the posture of the real object. Therefore, the operator performs a user operation for correcting the position and the posture (roll, pitch, and yaw) through the input unit 24a of the instruction device 2 so that the virtual object overlaps with the real object. In the state after the correction, the position and the posture of the virtual object are appropriately changed on the basis of the input signal S1 generated by the user operation of correcting the position and the posture described above. The correction receiving unit 16 generates the recognition correction information Ia for providing instruction on the correction of the position and the posture of the object corresponding to the target virtual object, and supplies the recognition correction information Ia to the recognition result acquisition unit 14. Thus, the correction of the position and the posture of the virtual object is reflected in the second recognition result Im2 as the correction of the recognition result of the position and the posture of the corresponding object.

Figure 5B:
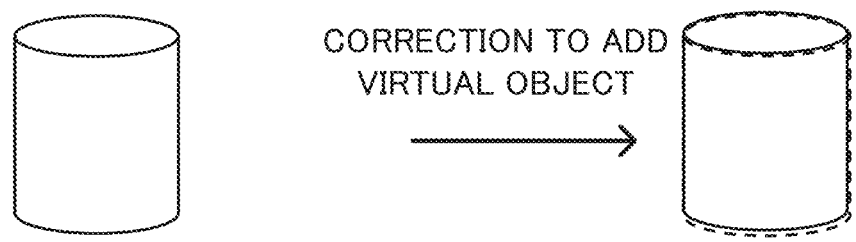
FIG. 5B shows a second mode of the correction.

According to the second mode illustrated in FIG. 5B, since the recognition result acquisition unit 14 fails to recognize the presence of the target object based on the sensor signal S4 in the condition prior to correction, any virtual object with respect to the target object is not displayed. Accordingly, in this instance, the operator performs an operation to instruct the generation of a virtual object for the target object through the input unit 24a of the instruction device 2. In this case, the operator may perform an operation to directly specify the position, posture, type, and other attributes of the target object to generate the virtual object, or may perform a user operation to provide instruction on the re-execution of the object recognition processing centered on the user-specified position of the real object that was not recognized. Then, in the state after the correction, the virtual object with respect to the target object is appropriately generated at the position and the posture that are consistent with the real object on the basis of the input signal S1 generated by the above-described user operation. Then, the correction receiving unit 16 generates the recognition correction information Ia indicating addition of the recognition result of the target object corresponding to the generated virtual object and supplies the recognition correction information Ia to the recognition result acquisition unit 14. Thus, the addition of the virtual object is reflected in the second recognition result Im2 as an addition of the recognition result of the corresponding object.

Figure 5C:
FIG. 5C shows a third mode of the correction.

According to the third mode shown in FIG. 5C, the virtual object for an object that is not actually present is generated in the state before correction due to the object misrecognition or the like in the recognition result acquisition unit 14. In this case, the operator operates the input unit 24Aa of the instruction device 2 to provide instruction on the deletion of the virtual object of the target object. In the state after the correction, the virtual object generated by the object misrecognition is appropriately deleted on the basis of the input signal S1 generated by the above-described user operation. Then, the correction receiving unit 16 generates the recognition correction information Ia for providing instruction on deletion of the recognition result of the object corresponding to the target virtual object and supplies the recognition correction information Ia to the recognition result acquisition unit 14. Thus, deletion of the virtual object is reflected in the second recognition result Im2 as deletion of the recognition result of the corresponding object.

Figure 5D:
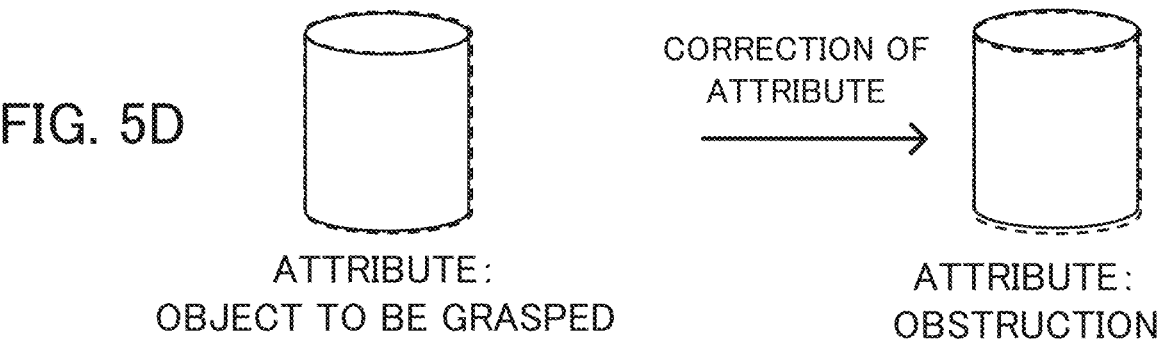
FIG. 5D shows a fourth mode of the correction.

According to the fourth mode illustrated in FIG. 5D, the virtual object having the attribute "object to be grasped" that is different from the true attribute "obstacle" of the target object is generated in the state before correction due to the error of the attribute (here, type) recognition processing of the object in the recognition result acquisition unit 14. In this case, the operator operates the input unit 24Aa of the instruction device 2 to modify the attribute of the target virtual object. In the state after the correction, the virtual object is properly modified based on the input signal S1 generated by the above-described user operation. Then, the correction receiving unit 16 generates the recognition correction information Ia indicating the modification of the attribute of the object corresponding to the target virtual object and supplies the recognition correction information Ia to the recognition result acquisition unit 14. Thus, the attribute change of the virtual object is reflected in the second recognition result Im2 as a correction of the recognition result regarding the attribute of the corresponding object.

Figure 6:
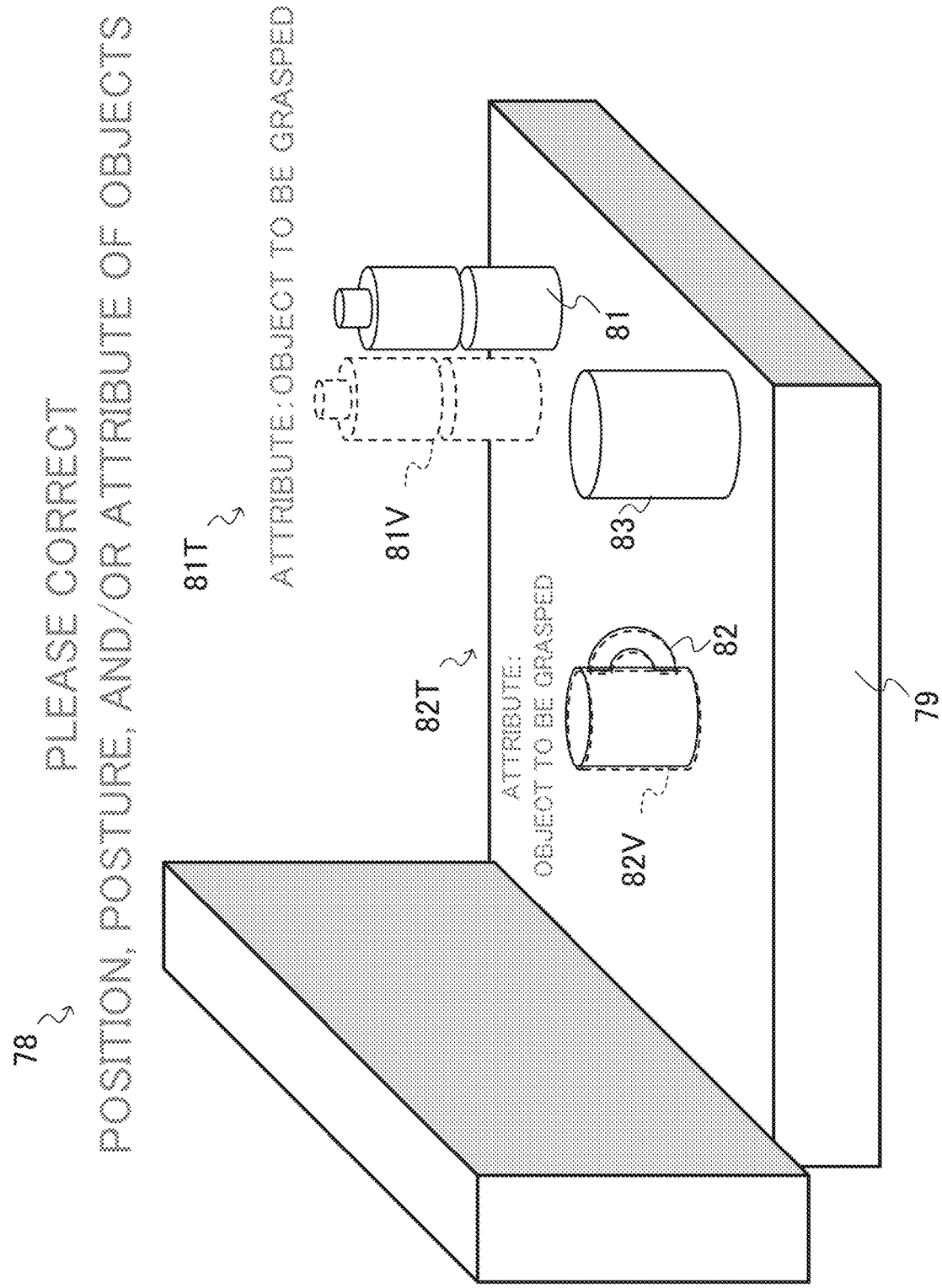
FIG. 6 It shows the state of the workspace before the correction, which is visually recognized by the operator, in the case where pick-and-place is set as the objective task.

Next, a specific example relating to correction based on the above-described first mode to fourth mode will be described. FIG. 6 shows the state of the workspace before correction, which is visually recognized by the operator, in the case where pick-and-place is set as the objective task. In FIG. 6, the first object 81, the second object 82, and the third object 83 are present on the work table 79. Then, the display control unit 15 displays the virtual objects 81V and 82V and the corresponding attribute information 81T and 82T to overlap with the scene (real world) or the live image that the operator views, together with the text information 78 prompting the correction of the position, posture, and attribute of the objects. It is herein assumed that an arbitrary calibration process used in augmented reality or the like is executed and that coordinate transformation among various coordinate systems such as a coordinate system of the sensor 7 and a display coordinate system for displaying a virtual object is appropriately performed.

In this case, the virtual object 81V is deviated from the position of the real object. In addition, the attribute (in this case, the "object to be grasped") of the virtual object 82V indicated by the attribute information 82T is different from the true attribute (in this case. "obstacle") of the second object 82. Furthermore, the third object 83 is not recognized by the robot controller 1, and the corresponding virtual object is not generated. Then, the correction receiving unit 16 receives the correction regarding these differences based on the input signal S1 supplied from the instruction device 2, and the display control unit 15 immediately displays newest virtual objects after the reflection of the correction.

Figure 7:
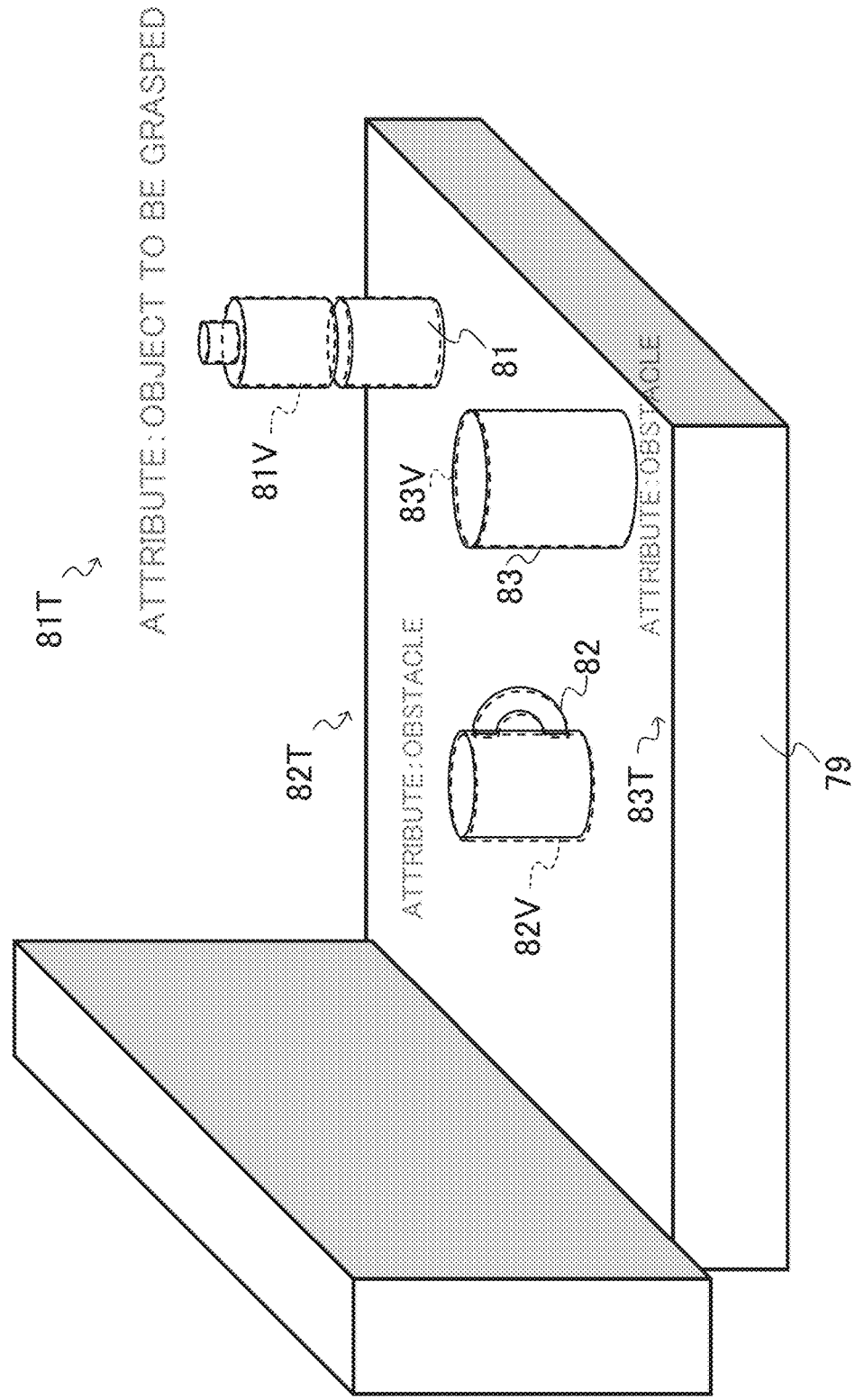
FIG. 7 It shows the state of the workspace that is visually recognized by the operator after the correction relating to the virtual object.

FIG. 7 shows the state of the workspace that the worker visually recognizes after the correction relating to the virtual objects. In FIG. 7, the virtual object 81V is appropriately arranged in a position where it overlaps with the actual object based on the manipulation of instructing the movement of the virtual object 81V. Further, the attribute "obstacle" indicated by the attribute information 82T is consistent with the attribute, to be recognized, of the second object 82 after the operation of instructing the modification of the attribute of the virtual object 82V. Further, based on the user operation of instructing the generation of a virtual object for the third object 83, a virtual object 83V for the third object 83 is generated at an appropriate position and posture. In addition, the attribute of the virtual object 83V indicated by the attribute information 83T matches the attribute, to be recognized, of the third object 83.

Then, in the example shown in FIG. 7, through the various correction operations, the correction receiving unit 16 receives the input signal S1 corresponding to the user operation of confirming the correction, and supplies the recognition correction information Ia indicating the received correction details to the recognition result acquisition unit 14. Thereafter, the recognition result acquisition unit 14 supplies the second recognition result Im2 to which the recognition correction information Ia is applied to the operation planning unit 17, and the operation planning unit 17 starts calculating the operation plan of the robot 5 based on the second recognition result Im2. In this instance, the display control unit 15 displays text information 78A notifying the operator of successful acceptance of the correction, the establishment of the operation plan, and the starting of the robot control.

In this way, the robot controller 1 can accurately correct the recognition error of an object in the workspace and accurately execute the establishment of the operation plan and the robot control based on the accurate recognition result.

Next, a supplementary description will be given of the determination regarding whether or not the correction by the correction receiving unit 16 is necessary. In the first example, the correction receiving unit 16 receives an input that specifies whether or not the correction is necessary: and determines whether or not the correction is necessary based on the input signal S1 corresponding to the input.

In the second example, the correction receiving unit 16 may determine whether or not the correction is necessary based on the confidence degree that represents the degree of confidence regarding the correctness of the recognition (estimation) result of the position, the posture, and the attribute of each object. In this case, the confidence degrees for the estimation results of the position, the posture, and the attribute are associated with the first recognition result Im1, respectively. Then, if every confidence degree for the estimation results is equal to or larger than a predetermined threshold value, the correction receiving unit 16 determines that the first recognition result Im1 need not be corrected, and supplies the recognition result acquisition unit 14 with the recognition correction information Ia indicating that the correction is not required. The above threshold value is stored, for example, in the memory 12 or the storage device 4.

On the other hand, if any of the confidence degrees for the estimation results is lower than the above-described threshold value, the correction receiving unit 16 determines that the first recognition result Im1 need to be corrected and instructs the display control unit 15 to perform the display control for receiving the correction instruction. Thereafter, the display control unit 15 performs display control for realizing the display as shown in FIG. 6.

In some embodiments, in the second example, the display control unit 15 determines the display mode of the various pieces of information represented by the first recognition result Im1 based on the confidence degree. For example, in the example shown in FIG. 6, if the confidence degree of either the position or the posture of the first object 81 is less than the threshold value, the display control unit 15 emphasizes and displays the virtual object 81V representing the position and the posture of the first object 81. The display control unit 15 highlights the attribute information 81T representing the attribute of the first object 81 if the confidence degree of the attribute of the first object 81 is less than the threshold value.

As such, the display control unit 15 emphasizes and displays information on a recognition result in which the necessity of correction is particularly high (that is, the confidence degree is less than the threshold value). Thus, it is possible to suitably suppress missing correction while smoothly supporting the operator to perform the correction.

Here, a supplementary description will be given of the confidence degree included in the first recognition result Im1. When estimating the position, the posture, and the attribute of the object detected on the basis of the sensor signal S4, the recognition result acquisition unit 14 calculates the confidence degree for each of the estimated elements and generates the first recognition result Im1 relating the calculated confidence degree to each of the estimated position, the posture, and the attribute of the object. In this case, for example, when the estimation model based on the neural network is used for estimation of the position, the posture, and the attribute of the object, the correction receiving unit 16 uses the confidence score (reliability score) that the estimation model outputs together with the estimation result as the above-described confidence degree. For example, the estimation model configured to estimate the position and the posture of the object is implemented as a regression type model, and the estimation model configured to estimate the attribute of the object is implemented as a classification type model.

(6) Details of Operation Sequence Generation Unit

Next, a description will be given of a detailed process in the operation planning unit 17.

(5-1) Functional Blocks

Figure 8:
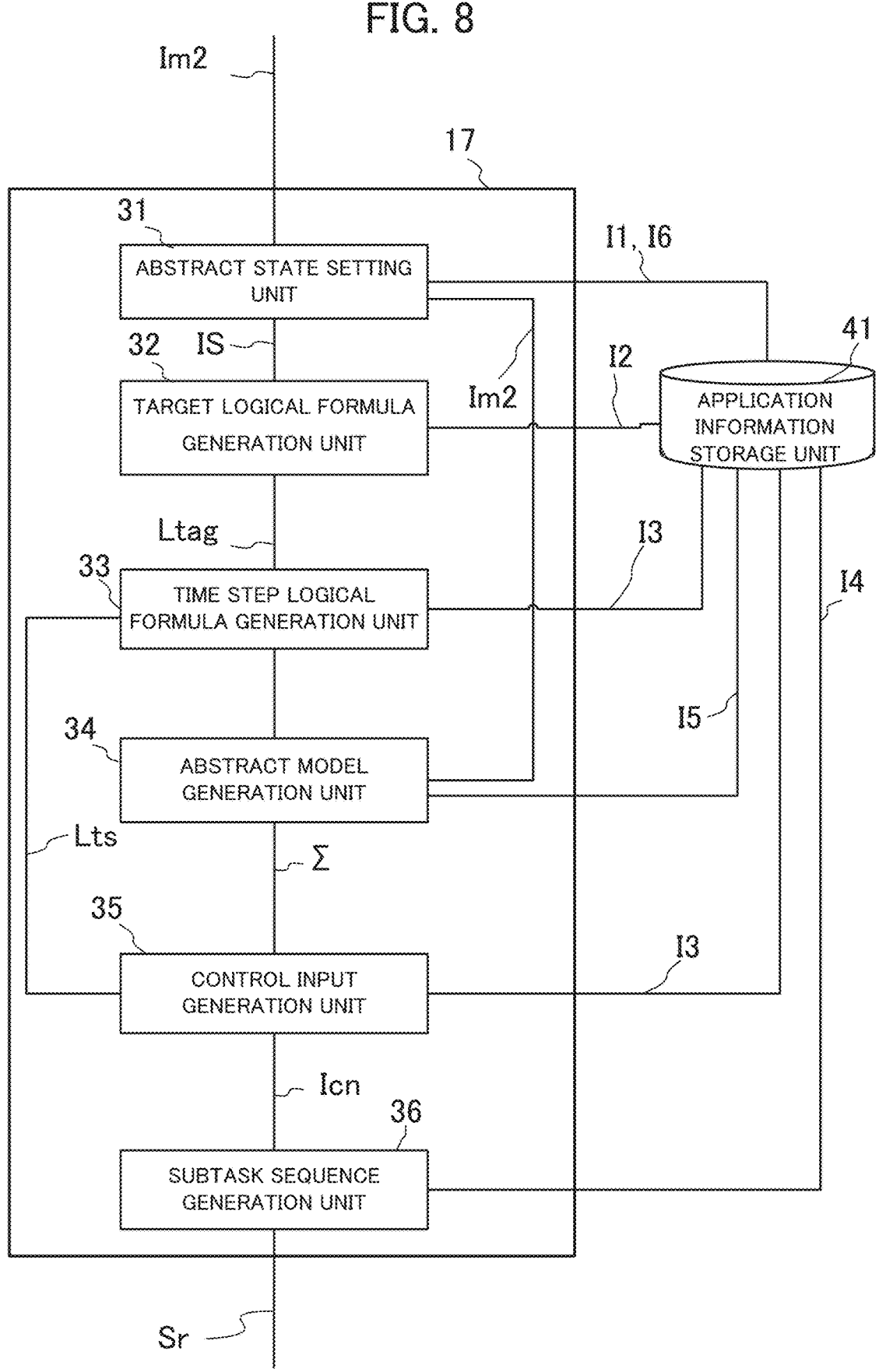
FIG. 8 It is an example of functional blocks showing the functional configuration of the operation planning unit.

FIG. 8 is an example of a functional block diagram showing the functional configuration of the operation planning unit 17. The operation planning unit 17 functionally includes an abstract state setting unit 31, a target logical formula generation unit 32, a time step logical formula generation unit 33, an abstract model generation unit 34, a control input generation unit 35, and a subtask sequence generation unit 36.

The abstract state setting unit 31 sets the abstract state in the workspace based on the second recognition result Im2 supplied from the recognition result acquisition unit 14. In this case, for each abstract state that needs to be considered when executing the objective task based on the second recognition result Im2, the abstract state setting unit 31 defines a proposition to be expressed in the form of a logical formula. The abstract state setting unit 31 supplies information (also referred to as "abstract state setting information IS") indicating the set abstract states to the target logical formula generation unit 32.

Based on the abstract state setting information IS, the target logical formula generation unit 32 converts the objective task into a logical formula (also referred to as "target logical formula Ltag"), in the form of a temporal logic, representing the final states to be achieved. In other words, the target logical formula generation unit 32 generates the target logical formula Ltag based on the initial state, that is identified based on the abstract state setting information IS, of the workspace prior to the operation of the robot 5 and the final achievement state of the workspace. Further, the target logical formula generation unit 32 refers to the constraint condition information I2 from the application information storage unit 41 and adds the constraint conditions to be satisfied in executing the target logical formula Ltag. Then, the target logical formula generation unit 32 supplies the generated target logical formula Ltag to the time step logical formula generation unit 33.

The target logical formula generation unit 32 may recognize the final achievement state of the workspace, on the basis of information previously stored in the storage device 4 or on the basis of an input signal S1 supplied from the instruction device 2.

The time step logical formula generation unit 33 converts the target logical formula Ltag supplied from the target logical formula generation unit 32 into a logical formula (also referred to as "time step logical formula Lts") representing the states at every time step. The time step logical formula generation unit 33 supplies the generated time step logical formula Lts to the control input generation unit 35.

The abstract model generation unit 34 generates an abstract model "Σ" in which the actual dynamics in the workspace is abstracted, on the basis of the abstract model information I5 stored in the application information storage unit 41 and the second recognition result Im2 supplied from the abstract state setting unit 31. In this case, the abstract model generation unit 34 considers the target dynamics as a hybrid system in which continuous dynamics and discrete dynamics are mixed, and generates an abstract model Σ based on the hybrid system. The method of generating the abstract model Σ will be described later. The abstract model generation unit 34 supplies the generated abstract model Σ to the control input generation unit 35.

The control input generation unit 35 determines a control input to the robot 5 for every time step such that the time step logical formula Lts supplied from the time step logical formula generation unit 33 and the abstract model 2 supplied from the abstract model generation unit 34 are satisfied and such that the evaluation function (e.g., a function representing the amount of energy consumed by the robot) is optimized. The control input generation unit 35 supplies information (also referred to as "control input information Icn") indicating the control input to the robot 5 for every time step to the subtask sequence generation unit 36.

The subtask sequence generation unit 36 generates an operation sequence Sr which is a sequence of subtasks based on the control input information Icn supplied from the control input generation unit 35 and the subtask information I4 stored in the application information storage unit 41. Then, the subtask sequence generation unit 36 supplies the operation sequence Sr to the robot control unit 17 and the robot control unit 18.

(6-2) Abstract State Setting Unit

The abstract state setting unit 31 sets the abstract states in the workspace based on the second recognition result Im2 and the abstract state specification information I1 acquired from the application information storage unit 41. In this case, first, the abstract state setting unit 31 refers to the abstract state specification information I1 and recognizes the abstract states to be set in the workspace. The abstract states to be set in the workspace varies depending on the type of objective task.

Figure 9:
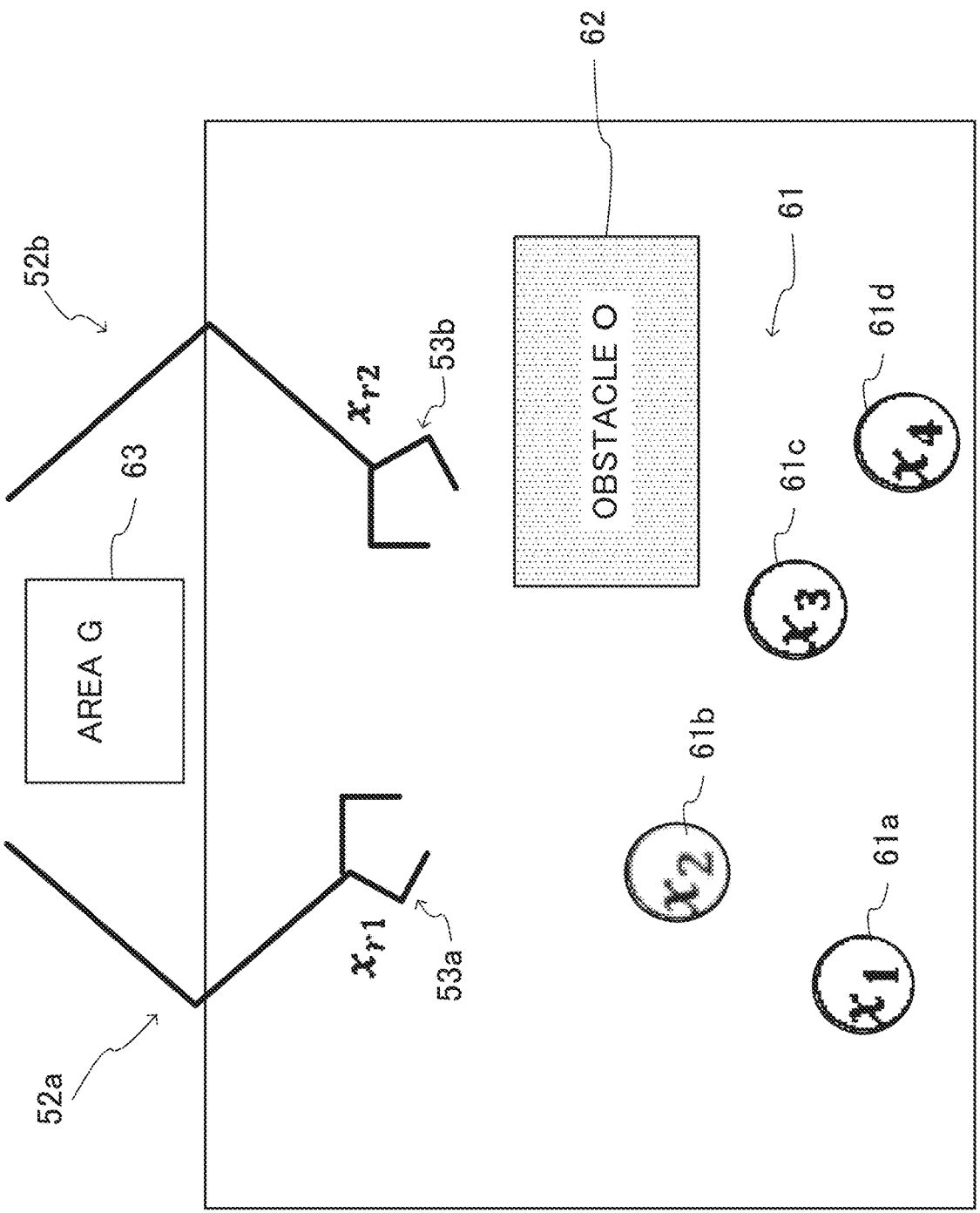
FIG. 9 It shows a bird's-eye view of the workspace when the pick-and-place is set as the objective task.

FIG. 9 shows a bird's-eye view of the workspace when pick-and-place is the objective task. In the workspace shown in FIG. 9, there are two robot arms 52a and 52b, four target objects 61 (61a to 61d), an obstacle 62, and an area G that is the destination of the target objects 61.

In this case, first, the abstract state setting unit 31 recognizes the states of the target objects 61, the existence range of the obstacle 62, the state of the robot 5, the existence range of the area G, and the like.

Here, the abstract state setting unit 31 recognizes the position vectors "$x_1$" to "$x_4$" indicative of the centers of the target objects 61a to 61d as the positions of the target objects 61a to 61d, respectively. Further, the abstract state setting unit 31 recognizes the position vector "$x_{r1}$" of the robot hand (end effector) 53a for grasping a target object as the position of the robot arm 52a and the position vector "$x_{r2}$" of the robot hand 53b for grasping a target object as the position of the robot arm 52b.

Similarly, the abstract state setting unit 31 recognizes the postures of the target objects 61a to 61d (it is unnecessary in the example of FIG. 6 because each target object is spherical), the existence range of the obstacle 62, the existence range of the area G, and the like. For example, when assuming that the obstacle 62 is a rectangular parallelepiped and the area G is a rectangle, the abstract state setting unit 31 recognizes the position vector of each vertex of the obstacle 62 and the area G.

The abstract state setting unit 31 determines the abstract states to be defined in the objective task by referring to the abstract state specification information I1. In this case, the abstract state setting unit 31 determines propositions indicating the abstract states based on: the second recognition result Im2 (e.g., the number of objects for each type) relating to the objects existing in the workspace: and the abstract state specification information I1.

In the example of FIG. 9, the abstract state setting unit 31 assigns identification labels "1" to "4" to the target objects 61a to 61d specified by the second recognition result Im2, respectively. Further, the abstract state setting unit 31 defines a proposition "$g_i$" that the target object "i" (i=1 to 4) exists in the area G that is the goal point to be finally placed. Further, the abstract state setting unit 31 assigns an identification label "O" to the obstacle 62 and defines the proposition "$o_i$" that the target object i interferes with the obstacle O. Furthermore, the abstract state setting unit 31 defines a proposition "h" that a robot arm 52 interferes with another robot arm 52. The abstract state setting unit 31 may further define the proposition "$v_i$" that the target object "i" exists on the work table (the table in which the target objects and the obstacle exist in their initial states), the proposition "$w_i$" that a target object exists in the non-work area other than the work table and the area G. The non-work area is, for example, an area (floor surface and the like) in which a target object exists when the target object falls down from the work table.

In this way, by referring to the abstract state specification information I1, the abstract state setting unit 31 recognizes the abstract states to be defined, and defines the propositions ($g_i$, $o_i$, h in the above-described example) representing the abstract states according to the number of the target objects 61, the number of the robot arms 52, the number of the obstacles 62, and the number of the robots 5. The abstract state setting unit 31 supplies the target logical formula generation unit 32 with the abstract state setting information Is which includes the information indicative of the propositions representing the abstract states.

(6-3) Target Logical Formula Generation Unit

First, the target logical formula generation unit 32 converts the objective task into a logical formula in which the temporal logic is used.

For example, in the example of FIG. 9, it is herein assumed that the objective task "the target object (i=2) finally exists in the area G" is given. In this case, the target logical formula generation unit 32 generates the logical formula "$\Diamond g_2$" which represents the objective task by using the operator "$\Diamond$" corresponding to "eventually" of the linear logical formula (LTL: Linear Temporal Logic) and the proposition "$g_i$" defined by the abstract state setting unit 31. The target logical formula generation unit 32 may express the logical formula by using any operators according to the temporal logic other than the operator "◇" such as logical AND "∧", logical OR "∨", negative "¬", logical implication "⇒", always "□", next "○", and until "U". The logical formula may be expressed by any temporal logic other than linear temporal logic such as MTL (Metric Temporal Logic) and STL (Signal Temporal Logic).

The objective task may be specified in a natural language. Various techniques exist for converting tasks expressed in a natural language into logical formulas.

Next, the target logical formula generation unit 32 generates the target logical formula Ltag by adding the constraint conditions indicated by the constraint condition information I2 to the logical formula indicating the objective task.

For example, provided that two constraint conditions "a robot arm 52 does not interfere with another robot arm 52" and "the target object i does not interfere with the obstacle O" for pick-and-place shown in FIG. 9 are included in the constraint condition information I2, the target logical formula generation unit 32 converts these constraint conditions into the logical formula. Specifically; the target logical formula generation unit 32 converts the above-described two constraint conditions into the following logical formulas, respectively, using the proposition "$o_i$" and the proposition "h" defined by the abstract state setting unit 31 in the case shown in FIG. 6.

$$□¬h$$
$$\wedge_i □¬o_i$$

Therefore, in this case, the target logical formula generation unit 32 generates the following target logical formula Ltag obtained by adding the logical formulas of these constraint conditions to the logical formula "◇$g_2$" corresponding to the objective task "the target object (i=2) finally exists in the area G".

$$(◇g_2) \wedge (□¬h) \wedge (\wedge_i □¬o_i)$$

In practice, the constraint conditions corresponding to the pick-and-place is not limited to the above-described two constraint conditions and there are other constraint conditions such as "a robot arm 52 does not interfere with the obstacle O", "plural robot arms 52 do not grasp the same target object", "target objects does not contact with each other". Such constraint conditions are also stored in the constraint condition information I2 and are reflected in the target logical formula Ltag.

(6-4) Time Step Logical Formula Generation Unit

The time step logical formula generation unit 33 determines the number of time steps (also referred to as the "target time step number") needed to complete the objective task, and determines possible combinations of propositions representing the states at every time step such that the target logical formula Ltag is satisfied with the target time step number. Since the combinations are normally plural, the time step logical formula generation unit 33 generates the time step logical formula Lts that is a logical formula obtained by combining these combinations by logical OR. Each of the combinations described above is a candidate of a logical formula representing a sequence of operations to be instructed to the robot 5, and therefore it is hereinafter also referred to as "candidate φ".

Here, a description will be given of a specific example of the process executed by the time step logical formula generation unit 33 in the case where the objective task "the target object (i=2) finally exists in the area G" exemplified in FIG. 9 is set.

In this instance, the following target logical formula Ltag is supplied from the target logical formula generation unit 32 to the time step logical formula generation unit 33.

$$(◇g_2) \wedge (□¬h) \wedge (\wedge_i □¬o_i)$$

In this case, the time-step logical formula generation unit 33 uses the proposition "$g_{i,k}$" that is the extended proposition "$g_i$" to include the concept of time steps. Here, the proposition "$g_{i,k}$" is the proposition "the target object i exists in the area G at the time step k". Here, when the target time step number is set to "3", the target logical formula Ltag is rewritten as follows.

$$(◇g_{2,3}) \wedge (\wedge_{k=1,2,3} □¬h_k) \wedge (\wedge_{i,k=1,2,3} □¬o_{i,k})$$

◇$g_{2,3}$ can be rewritten as shown in the following expression.

[Formula 1]
$$◇g_{2,3} = (¬g_{2,1} \wedge ¬g_{2,2} \wedge g_{2,3}) \vee$$
$$(¬g_{2,1} \wedge g_{2,2} \wedge g_{2,3}) \vee (g_{2,1} \wedge ¬g_{2,2} \wedge g_{2,3}) \vee (g_{2,1} \wedge g_{2,2} \wedge g_{2,3})$$

The target logical formula Ltag described above is represented by logical OR ($φ_1 \vee φ_2 \vee φ_3 \vee φ_4$) of four candidates "$φ_1$" to "$φ_4$" as shown in below.

[Formula 2]
$$φ_1 = (¬g_{2,1} \wedge ¬g_{2,2} \wedge g_{2,3}) \wedge (\wedge_{k=1,2,3} □¬h_k) \wedge (\wedge_{i,k=1,2,3} □¬o_{i,k})$$
$$φ_2 = (¬g_{2,1} \wedge g_{2,2} \wedge g_{2,3}) \wedge (\wedge_{k=1,2,3} □¬h_k) \wedge (\wedge_{i,k=1,2,3} □¬o_{i,k})$$
$$φ_3 = (g_{2,1} \wedge ¬g_{2,2} \wedge g_{2,3}) \wedge (\wedge_{k=1,2,3} □¬h_k) \wedge (\wedge_{i,k=1,2,3} □¬o_{i,k})$$
$$φ_4 = (g_{2,1} \wedge g_{2,2} \wedge g_{2,3}) \wedge (\wedge_{k=1,2,3} □¬h_k) \wedge (\wedge_{i,k=1,2,3} □¬o_{i,k})$$

Therefore, the time step logical formula generation unit 33 determines the time step logical formula Lts to be the logical OR of the four candidates $φ_1$ to $φ_4$. In this case, the time step logical formula Lts is true if at least one of the four candidates $φ_1$ to $φ_4$ is true.

Next, a supplementary description will be given of a method of setting the target time step number.

For example, the time step logical formula generation unit 33 determines the target time step number based on the prospective work time specified by the input signal S1 supplied from the instruction device 2. In this case, the time step logical formula generation unit 33 calculates the target time step number based on the prospective work time described above and the information on the time width per time step stored in the memory 12 or the storage device 4. In another example, the time step logical formula generation unit 33 stores in advance in the memory 12 or the storage device 4 information in which a suitable target time step number is associated with each type of objective task, and determines the target time step number in accordance with the type of objective task to be executed by referring to the information.

In some embodiments, the time step logical formula generation unit 33 sets the target time step number to a predetermined initial value. Then, the time step logical formula generation unit 33 gradually increases the target time step number until the time step logical formula Lts which enables the control input generation unit 35 to determine the control input is generated. In this case, if the control input generation unit 35 ends up not being able to derive the optimal solution in the optimization processing with the set target time step number, the time step logical formula generation unit 33 adds a predetermined number (1 or more integers) to the target time step number.

In this case, the time step logical formula generation unit 33 may set the initial value of the target time step number to a value smaller than the number of time steps corresponding to the work time of the objective task expected by the user. Thus, the time step logical formula generation unit 33 suitably suppresses setting the target time step number to an unnecessarily large number.

(6-5) Abstract Model Generation Unit

The abstract model generation unit 34 generates the abstract model 2 based on the abstract model information I5 and the second recognition result Im2. Here, in the abstract model information I5, information required to generate the abstract model 2 is recorded for each type of objective task. For example, when the objective task is a pick-and-place, a general-purpose abstract model is recorded in the abstract model information I5, wherein the position or the number of target objects, the position of the area where the target objects are to be placed, the number of robots 5 (or the number of robot arms 52), and the like are not specified in the general-purpose abstract model. The abstract model generation unit 34 generates the abstract model Σ by reflecting the second recognition result Im2 in the general-purpose abstract model which includes the dynamics of the robot 5 and which is recorded in the abstract model information I5. Thereby, the abstract model Σ is a model in which the states of objects existing in the workspace and the dynamics of the robot 5 are abstractly expressed. In the case of pick-and-place, the states of the objects existing in the workspace indicate the position and the number of the target objects, the position of the area where the target object are to be placed, the number of robots 5, and the like.

When there are one or more other working bodies, information on the abstracted dynamics of the other working bodies may be included in the abstract model information I5. In this case, the abstract model Σ is a model in which the states of the objects existing in the workspace, the dynamics of the robot 5, and the dynamics of the other working bodies are abstractly expressed.

Here, during the work of the objective task by the robot 5, the dynamics in the workspace is frequently switched. For example, in the case of pick-and-place, while the robot arm 52 is gripping the target object i, the target object i can be moved. However, if the robot arm 52 is not gripping the target object i, the target object i cannot be moved.

In view of the above, in the present example embodiment, in the case of pick-and-place, the operation of grasping the target object i is abstractly expressed by the logical variable "$\delta_i$". In this case, for example, the abstract model generation unit 34 can define the abstract model Σ to be set for the workspace shown in FIG. 9 as the following equation (1).

[Formula 3]

$$\begin{bmatrix} x_{r1} \\ x_{r2} \\ x_1 \\ \vdots \\ x_4 \end{bmatrix}_{k+1} = I \begin{bmatrix} x_{r1} \\ x_{r2} \\ x_1 \\ \vdots \\ x_4 \end{bmatrix}_k + \begin{bmatrix} I & 0 \\ 0 & I \\ \delta_{1,1}I & \delta_{2,1}I \\ \vdots & \vdots \\ \delta_{1,4}I & \delta_{2,4}I \end{bmatrix} \begin{bmatrix} u_1 \\ u_2 \end{bmatrix} \quad (1)$$

$$h_{ij_{min}}(1-\delta_i) \leq h_{ij}(x) \leq h_{ij_{max}}\delta_i + (\delta_i - 1)\varepsilon$$

Here, "$u_j$" indicates a control input of controlling the robot hand j ("j=1" is the robot hand 53*a*, "j=2" is the robot hand 53*b*), and "I" indicates a unit matrix and "0" indicates zero (null) matrix. It is noted that the control input is herein assumed to be a speed as an example but it may be an acceleration. Further, "$\delta_{j,i}$" is a logical variable that is set to "1" when the robot hand j grasps the target object i and is set to "0" in other cases. Each of "$x_{r1}$" and "$x_{r2}$" indicates the position vector of the robot hand j (j=1, 2), and each of "$x_1$" to "$x_4$" indicates the position vector of the target object i (i=1 to 4). If the target object i has a shape other than a sphere and therefore it is necessary to consider the posture of the target object i, each of the vectors "x" to "$x_4$" includes an element representing the posture represented by Euler angle, for example. Further, "h (x)" is a variable to be "h(x)>=0" when the robot hand exists in the vicinity of a target object to the extent that it can grasp the target object, and satisfies the following relationship with the logical variable δ.

$$\delta = 1 \Leftrightarrow h(x) \geq 0$$

In the above expression, when the robot hand exists in the vicinity of a target object to the extent that the target object can be grasped, it is considered that the robot hand grasps the target object, and the logical variable δ is set to 1.

Here, the expression (1) is a difference equation showing the relationship between the states of the objects at the time step k and the states of the objects at the time step k+1. Then, in the above expression (1), the state of grasping is represented by a logical variable that is a discrete value, and the movement of the target object is represented by a continuous value. Accordingly, the expression (1) shows a hybrid system.

The expression (1) considers not the detailed dynamics of the entire robot 5 but only the dynamics of the robot hand, which is the hand of the robot 5 that actually grasps a target object. Thus, it is possible to suitably reduce the calculation amount of the optimization process by the control input generation unit 35.

Further, the abstract model information I5 includes: information for deriving the difference equation indicated by the expression (1) from the second recognition result Im2; and the logical variable corresponding to the operation (the operation of grasping a target object i in the case of pick-and-place) causing the dynamics to switch. Thus, even when there is a variation in the position and the number of the target objects, the area (area G in FIG. 9) where the target objects are to be placed and the number of the robots 5 and the like, the abstract model generation unit 34 can determine the abstract model Σ in accordance with the environment of the target workspace based on the abstract model information I5 and the second recognition result Im2.

It is noted that, in place of the model shown in the expression (1), the abstract model generation unit 34 may generate any other hybrid system model such as mixed logical dynamical (MLD) system and a combination of Petri nets and automaton.

(6-6) Control Input Generation Unit

The control input generation unit 35 determines the optimal control input of the robot 5 with respect to each time step based on the time step logical formula Lts supplied from the time step logical formula generation unit 33 and the abstract model 2 supplied from the abstract model generation unit 34. In this case, the control input generation unit 35 defines an evaluation function for the objective task and solves the optimization problem of minimizing the evaluation function while setting the abstract model 2 and the time step logical formula Lts as constraint conditions. For example, the evaluation function is predetermined for each type of the objective task and stored in the memory 12 or the storage device 4.

For example, when the objective task is pick-and-place, the control input generation unit 35 determines the evaluation function such that the control input "$u_k$" and the distance "$d_k$" between the target object to be carried and the goal point of the target object are minimized (i.e., the energy spent by the robot 5 is minimized). The distance $d_k$ described above corresponds to the distance between the target object 2 and the area G when the objective task is "the target object (i=2) finally exists in the area G."

For example, the control input generation unit 35 determines the evaluation function to be the sum of the square of the distance $d_k$ and the square of the control input $u_k$ in all time steps. Then, the control input generation unit 35 solves the constrained mixed integer optimization problem shown in the following expression (2) while setting the abstract model $\Sigma$ and the time-step logical formula Lts (that is, the logical OR of the candidates $\varphi_i$) as the constraint conditions.

[Formula 4]

$$\min_u \left( \sum_{k=0}^{T} (\|d_k\|_2^2 + \|u_k\|_2^2) \right) \text{ s.t. } \sum \vee \phi_i \qquad (2)$$

Here, "T" is the number of time steps to be set in the optimization and it may be a target time step number or may be a predetermined number smaller than the target time step number as described later. In some embodiments, the control input generation unit 35 approximates the logical variable to a continuous value (i.e., solve a continuous relaxation problem). Thereby, the control input generation unit 35 can suitably reduce the calculation amount. When STL is adopted instead of linear temporal logic (LTL), it can be described as a nonlinear optimization problem.

Further, if the target time step number is large (e.g., larger than a predetermined threshold value), the control input generation unit 35 may set the time step number T in the expression (2) used for optimization to a value (e.g., the threshold value described above) smaller than the target time step number. In this case, the control input generation unit 35 sequentially determines the control input $u_k$ by solving the optimization problem based on the expression (2), for example, every time a predetermined number of time steps elapses.

In some embodiments, the control input generation unit 35 may solve the optimization problem based on the expression (2) for each predetermined event corresponding to the intermediate state for the accomplishment state of the objective task and determine the control input $u_k$ to be used. In this case, the control input generation unit 35 determines the time step number T in the expression (2) to be the number of time steps up to the next event occurrence. The event described above is, for example, an event in which the dynamics switches in the workspace 6. For example, when pick-and-place is the objective task, examples of the event include "the robot 5 grasps the target object" and "the robot 5 finishes carrying one of the target objects to the destination (goal) point." For example, the event is predetermined for each type of the objective task, and information indicative of one or more events for each type of the objective task is stored in the storage device 4.

(6-7) Subtask Sequence Generation Unit

The subtask sequence generation unit 36 generates the operation sequence Sr based on the control input information Icn supplied from the control input generation unit 35 and the subtask information I4 stored in the application information storage unit 41. In this case, by referring to the subtask information I4, the subtask sequence generation unit 36 recognizes subtasks that the robot 5 can accept and converts the control input of every time step indicated by the control input information Icn into subtasks.

For example, in the subtask information I4, there are defined functions representing two subtasks, the movement (reaching) of the robot hand and the grasping by the robot hand, as subtasks that can be accepted by the robot 5 when the objective task is pick-and-place. In this case, the function "Move" representing the reaching is, for example, a function that uses the following three arguments (parameter): the initial state of the robot 5 before the function is executed: the final state of the robot 5 after the function is executed: and the time to be required for executing the function. In addition, the function "Grasp" representing the grasping is, for example, a function that uses the following these arguments: the state of the robot 5 before the function is executed: the state of the target object to be grasped before the function is executed; and the logical variable δ. Here, the function "Grasp" indicates performing a grasping operation when the logical variable δ is "1", and indicates performing a releasing operation when the logical variable δ is "0". In this case, the subtask sequence generation unit 36 determines the function "Move" based on the trajectory of the robot hand determined by the control input of every time step indicated by the control input information Icn. and determines the function "Grasp" based on the transition of the logical variable δ in units of time step indicated by the control input information Icn.

Then, the subtask sequence generation unit 36 generates the operation sequence Sr configured by the function "Move" and the function "Grasp", and supplies a control signal S3 indicating the subtask sequence to the robot control unit 18. For example, if the objective task is "the target object (i=2) finally exists in the area G", the subtask sequence generation unit 36 generates the operation sequence of the function "Move", the function "Grasp", the function "Move", and the function "Grasp" for the robot hand closest to the target object 2. In this case, the robot hand closest to the target object (i=2) moves to the position of the target object 2 by the function "Move", grasps the target object (i=2) by the function "Grasp", moves to the area G by the function "Move", and places the target object (i=2) in the area G by the function "Grasp".

(7) Processing Flow

Figure 10:
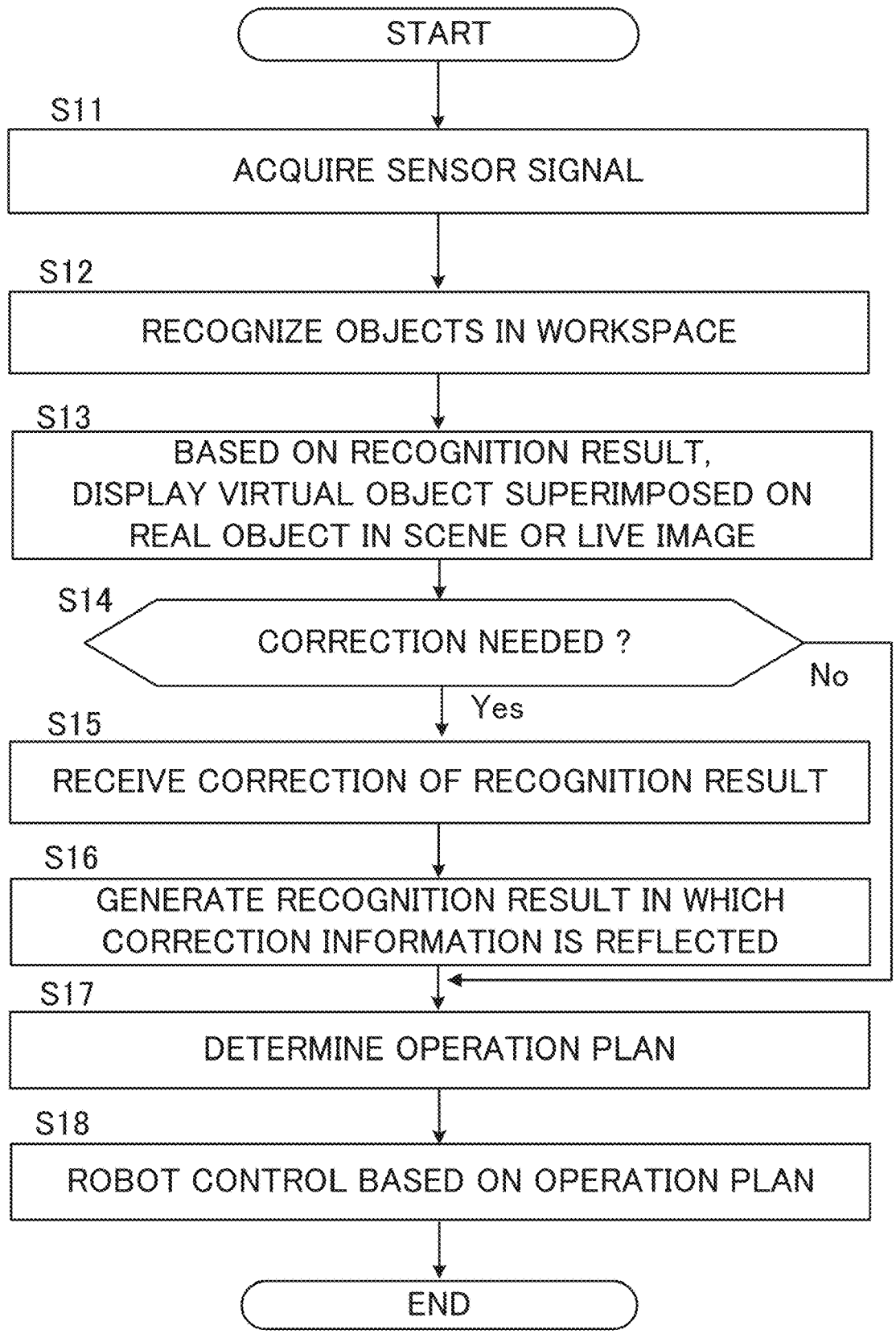
FIG. 10 It is an example of a flowchart showing an outline of a robot control process which the robot controller executes in the first example embodiment.

FIG. 10 is an example of a flowchart illustrating an outline of the robot control process that is executed by the robot controller 1 in the first example embodiment.

First, the robot controller 1 acquires the sensor signal S4 from the sensor 7 (step S11). The recognition result acquisition unit 14 of the robot controller 1 recognizes the state (including the position and the posture) and the attribution of each object in the workspace on the basis of the acquired sensor signal S4 (step S12). Accordingly, the recognition result acquisition unit 14 generates the first recognition result Im1 regarding objects in the workspace.

Next, the display control unit 15 causes the instruction device 2 to display the virtual object superimposed on the actual object in the scene or in the live image, on the basis of the first recognition result Im1 (step S13). In this instance, the display control unit 15 generates the display control signal S2 for displaying the virtual object corresponding to each object identified by the first recognition result Im1 and supplies the display control signal S2 to the instruction device 2.

Then, the correction receiving unit 16 determines whether or not the correction of the first recognition result Im1 is necessary (step S14). In this instance, the correction receiving unit 16 may determine whether or not the correction is necessary based on the confidence degree included in the first recognition result Im1, or may determine whether or not the correction is necessary based on an input that specifies whether or not the correction is necessary.

If it is determined that the correction of the first recognition result Im1 is necessary (step S14: Yes), the correction receiving unit 16 receives the correction of the first recognition result Im1 (step S15). In this instance, the correction receiving unit 16 receives correction (specifically, designation of the target to be corrected and designation of the correction details) based on any kind of user operation mode using the input unit 24a that functions as an arbitrary user interface provided in the instruction device 2. Then, the recognition result acquisition unit 14 generates the second recognition result Im2 in which the recognition correction information Ia generated by the correction receiving unit 16 is reflected (step S16). On the other hand, if it is determined that the correction of the first recognition result Im1 is not necessary (step S14: No), the correction receiving unit 16 proceeds with the process at step S17. In this instance, the correction receiving unit 16 supplies the recognition correction information Ia indicating that the correction is not necessary to the recognition result acquisition unit 14, and the recognition result acquisition unit 14 supplies the first recognition result Im1 to the operation planning unit 17 as the second recognition result Im2.

Then, the operation planning unit 17 determines the operation plan of the robot 5 based on the second recognition result Im2 (step S17). Thus, the operation planning unit 17 generates the operation sequence Sr which is the operation sequence to be executed by the robot 5. Then, the robot control unit 18 performs robot control based on the determined operation plan (step S18). In this instance, the robot control unit 18 sequentially supplies the control signal S3 generated on the basis of the operation sequence Sr to the robot 5 and controls the robot 5 to operate in accordance with the generated operation sequence Sr.

(8) Modifications

The block configuration of the operation planning unit 17 shown in FIG. 8 is an example, and various changes may be made thereto.

For example, information on the candidates φ for the sequence of operations to be instructed to the robot 5 is stored in advance in the storage device 4, and based on the information, the operation planning unit 17 executes the optimization process to be executed by the control input generation unit 35. Thus, the operation planning unit 17 performs selection of the optimum candidate φ and determination of the control input of the robot 5. In this instance, the operation planning unit 17 may not have a function corresponding to the abstract state setting unit 31, the target logical formula generation unit 32, and the time step logical formula generation unit 33 in generating the operation sequence Sr. Thus, information on the execution results from a part of the functional blocks in the operation sequence generation unit 16 shown in FIG. 8 may be stored in advance in the application information storage unit 41.

In another example, the application information includes design information such as a flowchart for designing the operation sequence Sr to complete the objective task in advance, and the operation planning unit 17 may generate the operation sequence Sr by referring to the design information. For example, JP2017-39170A discloses a specific example of executing a task based on a pre-designed task sequence.

Second Example Embodiment

The robot controller 1 according to the second example embodiment displays information (also referred to as "trajectory information") regarding the trajectory of each object (including the target objects and the robot 5) based on the formulated operation plan, and performs a process of receiving the correction relating to the trajectory in place of or in addition to the process of receiving the correction of the first recognition result Im1. Thus, the robot controller 1 according to the second example embodiment suitably corrects the operation plan so that the objective task is executed according to the process flow intended by the operator.

Hereafter, in the robot control system 100, the same components as in the first example embodiment are appropriately denoted by the same reference numerals, and a description thereof will be omitted. The configuration of the robot control system 100 in the second example embodiment is identical to the configuration shown in FIG. 1.

Figure 11:
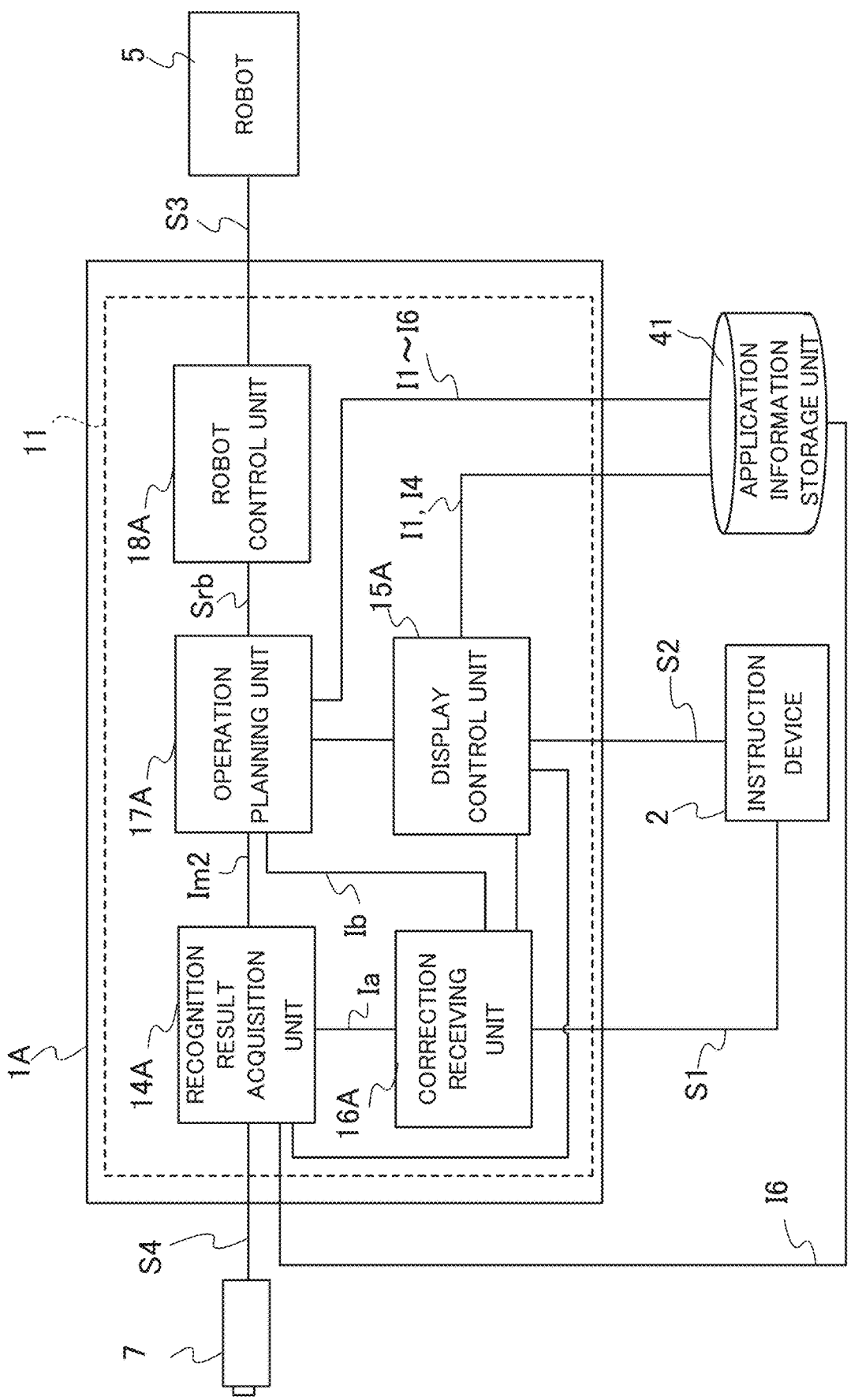
FIG. 11 It is an example of functional blocks of the robot controller in the second example embodiment.

FIG. 11 is an exemplary functional block diagram of the robot controller 1A in the second example embodiment. The robot controller 1A has the hardware configuration shown in FIG. 2A, and the processor 11 of the robot controller 1A functionally includes a recognition result acquisition unit 14A, a display control unit 15A, a correction receiving unit 16A, an operation planning unit 17A, and a robot control unit 18A.

As in the first example embodiment, the recognition result acquisition unit 14A generates the first recognition result Im1 and generates the second recognition result Im2 based on the recognition correction information Ia.

The display control unit 15A acquires the trajectory information identified from the operation plan determined by the operation planning unit 17A from the operation planning unit 17A and performs control of the instruction device 2 based on the trajectory information, in addition to the process that the display control unit 15 executes in the first example embodiment. In this case, the display control unit 15A generates a display control signal S2 for the instruction device 2 to display the trajectory information regarding the trajectory of the target object and the like for each time step indicated by the operation sequence Sr. and supplies the display control signal S2 to the instruction device 2. In this case, the display control unit 15A may display the trajectory information representing the trajectory of the robot 5 in addition to the trajectory of the target object. The display control unit 15A may herein display information representing a transition of states of the target object and the like identified at intervals of one time-step as the trajectory information, or may display information representing a transition of states of the target object or the like identified at the intervals of predetermined time steps.

The correction receiving unit 16A receives the correction of the trajectory information based on the operation by the operator who uses the instruction device 2, in addition to the generation process of the recognition correction information Ia which is executed by the correction receiving unit 16 in the first example embodiment. When the user operation relating to the correction is completed, the correction receiving unit 16A generates the trajectory correction information "Ib" indicating the correction details relating to the trajectory of the target object and the like and supplies the trajectory correction information Ib to the operation planning unit 17A. If there is no input relating to the correction, the correction receiving unit 16A supplies the operation planning unit 17A with the trajectory correction information Ib indicating that there is no correction.

The operation planning unit 17A generates an operation sequence Sr (also referred to as "second operation sequence Srb") in which the trajectory correction information Ib supplied from the correction receiving unit 16A is reflected, in addition to generating the operation sequence Sr that is executed by the operation planning unit 17 in the first example embodiment. Thus, the operation planning unit 17A formulates a new operation plan in which the original operation plan is modified so that the state of the target object specified by the correction is realized. Then, the operation planning unit 17A supplies the generated second operation sequence Srb to the robot controller 18. Hereafter, for convenience, the operation sequence Sr prior to reflection of the trajectory correction information Ib is also referred to as "first operation sequence Sr". Further, the operation plan based on the first operation sequence Sr is referred to as "first operation plan", and the operation plan based on the second operation sequence Srb is referred to as "second operation plan". If the trajectory correction information Ib indicating that the correction of the first operation plan is not necessary is generated, the second operation sequence Srb is identical to the first operation sequence Sr.

The operation planning unit 17A may determine whether or not the second operation sequence Srb after the reflection of the trajectory correction information Ib satisfies the constraint conditions. Then, only if the constraint conditions indicated by the constraint condition information I2 are satisfied, the operation planning unit 17A supplies the generated second operation sequence Srb to the robot control unit 18. Thus, only the operation plan satisfying the constraint conditions can be suitably executed by the robot 5. If the second operation sequence Srb does not satisfy the constraint conditions, the operation planning unit 17A instructs the display control unit 15A and the operation planning unit 17A to execute a process of receiving the re-correction.

The robot control unit 18A controls the operation of the robot 5 by supplying a control signal S3 to the robot 5 through the interface 13 based on the second operation sequence Srb supplied from the operation planning unit 17A.

An approach for the generation of the trajectory information will be herein supplemented. After generating the first operation sequence Sr, the operation planning unit 17A supplies the trajectory information regarding the target object (and the robot 5) required for display control by the display control unit 15A to the display control unit 15A. In this case, the position (and posture) vectors (refer to the equation (1)) of the robot 5 (in detail, the robot hand) and the target object are obtained with respect to each time step by the optimization process based on the equation (2) executed in the formulation of the first operation plan. Therefore, the operation planning unit 17A supplies these position (and posture) vectors to the display control unit 15A as the trajectory information. The trajectory information provided by the operation planning unit 17A to the display control unit 15A may herein include information (i.e., information identified by $\delta_{j,\,i}$ in the equation (1)) regarding the timing of gripping (and releasing) the target object by the robot hand, the direction of gripping (and releasing) the target object, and the posture of the robot hand when the robot hand grips (and releases) the target object. It is noted that the direction of grasping (and releasing) the target object may be identified based on, for example, the trajectory of the position vector of the robot hand and the timing of grasping (and releasing) the target object.

In the functional block diagram shown in FIG. 11, although the process in the first example embodiment is assumed to be performed, it is not limited thereto. Instead, the robot controller 1A may not execute the process relating to the correction of the first recognition result Im1 (the generation of the recognition correction information Ia by the correction receiving unit 16A, the generation of the second recognition result Im2 by the recognition result acquisition unit 14A, the display control relating to the first recognition result Im1 by the display control unit 15A, or the like).

Next, specific examples (first specific example and second specific example) of the process relating to the display and correction of the trajectory information regarding the target object and the like in the second example embodiment will be described.

Figure 12:
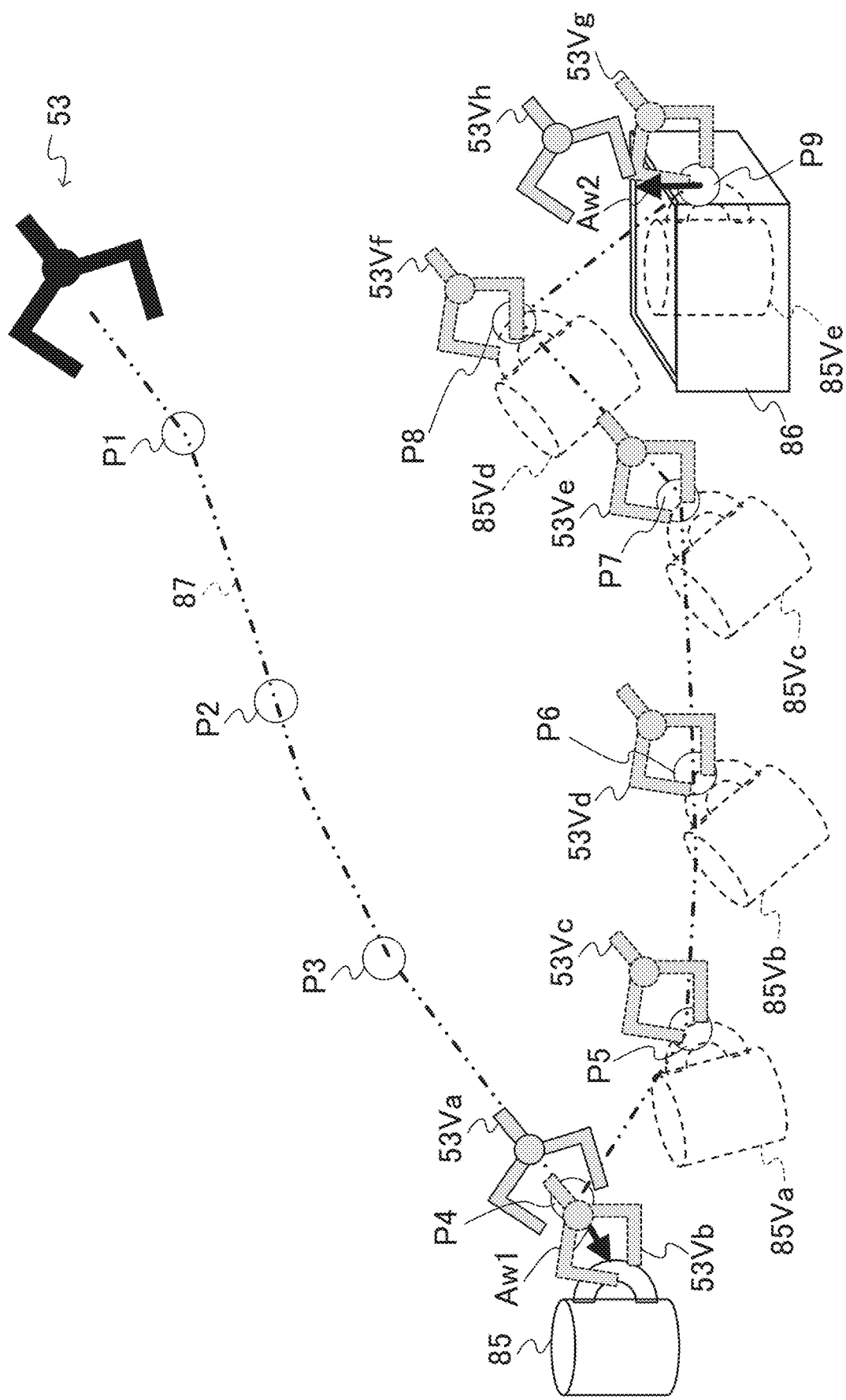
FIG. 12 It shows the trajectory information in a first specific example.

FIG. 12 is a diagram showing the trajectory information according to the first specific example. The first specific example is a specific example relating to such an objective task that the target object 85 is placed on the box 86, and the robot controller 1A schematically displays the trajectories of the robot hand 53 of the robot 5 and the target object 85 identified by the first operation plan determined by the operation planning unit 17A.

In FIG. 12, the positions "P1" to "P9" indicate the positions of the robot hand 53 at the intervals of a predetermined number of time steps based on the first operation plan, and the trajectory line 87 indicates the trajectory (path) of the robot hand 53 based on the first operation plan. Further, the virtual objects "85Va" to "85Ve" indicate virtual objects representing the positions and postures of the target object 85 at intervals of a predetermined number of time steps based on the first operation plan. Further, an arrow "Aw1" indicates a direction in which the robot hand 53 grasps the target object 85 when switching to the grasping state based on the first operation plan, and an arrow "Aw2" indicates a direction away from the target object 85 when the robot hand 53 switches to the non-grasping state based on the first operation plan. Further, the virtual robot hands "53Va" to "53Vh" are virtual objects representing the postures of the robot hand 53 just before and immediately after the robot hand 53 switches between the grasping state and the non-grasping state based on the first operation plan. Since the trajectory of the robot hand 53, which is the end effector of the robot 5, is generated as the trajectory of the robot 5 in the first operation plan formulated by the operation planning unit 17A, the trajectory of the robot hand 53 is shown as the trajectory of the robot 5 in this case.

Based on the trajectory information received from the operation planning unit 17A, the display control unit 15A causes the instruction device 2 to display: the positions P1 to P9, the trajectory line 87, and the arrows Aw1 and Aw2 which are representing the trajectory of the robot hand 53: the virtual robot hands 53Va to 53Vh representing the postures of the robot hand 53 immediately before and after switching between the gripping state and the non-gripping state; and the virtual objects 85Va to 85Ve representing the trajectory of the target object 85. Thus, the display control unit 15A may allow the operator to suitably grasp the outline of the formulated first operation plan. When the trajectory of each joint of the robot 5 is required in the first operation plan, the display control unit 15A may display the trajectory of each joint of the robot 5 in addition to the trajectory of the robot hand 53.

Then, the correction receiving unit 16A receives the correction of the respective elements identified based on the first operation plan shown in FIG. 12. The correction target in this instance may be a state (including the postures of the robot hand 53 specified by the virtual robot hands 53Va to 53Vh) of the robot hand 53 or the target object 85 at any time step, or may be each timing of grasping and non-grasping the target object, and the like.

Here, in the first operation plan shown in FIG. 12, the robot hand 53 is about to put the target object 85 in the box 86 while gripping the handle portion of the target object 85. In this case, the robot hand 53 cannot correctly put the target object 85 in the box 86 due to the interference between the robot hand 43 and the box 86, and the task could end in failure. In view of the above, the operator operates the instruction device 2 to generate the correction to add the operation of changing grasping position of the target object 85 to hold the upper portion of the target object 85 after the robot hand 53 carries the target object 85 in a state of gripping the handle portion of the target object 85 by up to the vicinity of the box 86. The correction receiving unit 16A generates the trajectory correction information Ib based on the input signal S1 generated by the above-described manipulation and supplies the generated trajectory correction information Ib to the operation planning unit 17A. Then, the operation planning unit 17A generates the second operation sequence Srb in which the trajectory correction information Ib has been reflected, and the display control unit 15A causes the instruction device 2 to display the trajectory information identified by the second operation sequence Srb again.

FIG. 13 is a diagram schematically illustrating the modified trajectory information regarding the robot hand 53 and the target object 85 modified on the basis of the user input of correcting the trajectory or the like of the robot hand 53 and the target object 85 in the first specific example.

In FIG. 13, the positions "P11" to "P20" indicate the positions of the robot hand 53 at intervals of the predetermined number of time steps based on the modified second operation plan, and the trajectory line 88 indicates the trajectory (path) of the robot hand 53 based on the modified second operation plan. Further, the virtual objects "85Vf" to "85Vj" indicate virtual objects representing the positions and postures of the target object 85 at intervals of the predetermined number of time steps based on the second operation plan. In addition, the arrows "Aw11" and "Aw13" each indicate the direction in which the target object 85 is grasped when the robot hand 53 is switched from the non-grasping state to the grasping state based on the second operation plan, and the arrows "Aw12" and "Aw14" each indicates the direction in which the robot hand 53 is away from the target object 85 when it is switched from the grasping state to the non-grasping state based on the second operation plan. Further, the virtual robot hands "53Vj" to "53Vm" are virtual objects representing the postures of the robot hand 53 just before the robot hand 53 switches between the grasping state and the non-grasping state based on the second operation plan. Instead of the example shown in FIG. 13, the correction receiving unit 16A may also additionally display the virtual object representing the posture of the robot hand 53 immediately after the robot hand 53 switches between the grasping state and the non-grasping state on the basis of the second operation plan in the same manner as in FIG. 12.

In the example shown in FIG. 13, the correction receiving unit 16A generates the trajectory correction information Ib indicating an operation of placing the target object 85 on a horizontal surface and an operation of grasping an upper portion of the target object 85 (i.e., an operation of changing grasping position of the target object 85) at time steps corresponding to the position P6 or the position P7 in FIG. 12 based on the user operation of the operator. The operation of placing the target object 85 on the horizontal plane is an operation relating to the position P16, the virtual object 85Vg, the virtual robot hand 53Vk and the arrow Aw12, and the operation of grasping the upper portion of the target object 85 is an operation relating to the position P17, the virtual robot hand 53Vl and the arrow Aw13. The trajectory correction information Ib also includes information regarding the correction of the operation of placing the target object 85 in the box 86 that is modified along with the above-mentioned operation changes (additions). For example, regarding the operation of placing the target object 85 in the box 86, a virtual robot hand 53Vm that indicates a different posture from the posture of the robot hand 53 specified by the virtual robot hand 53Vg or 53Vh shown in FIG. 12 is displayed in FIG. 13. The operation planning unit 17A determines the second operation plan shown in FIG. 13 based on the trajectory correction information Ib.

Here, a supplementary description will be given of the method of determining the second operation plan. As a first example, the operation planning unit 17A recognizes the correction shown in the trajectory correction information Ib as an additional constraint condition. Then, the operation planning unit 17A calculates the state of the robot hand 53 and the target object 85 for each time step by re-executing the optimization process shown in the equation (2), on the basis of the additional constraint condition and the pre-existing constraint conditions indicated by the constraint condition information I2. Then, the display control unit 15 causes the instruction device 2 to display the trajectory information based on the calculation result described above again. If the operation planning unit 17A receives the input signal S1 or the like indicating the approval of the re-displayed trajectories of robot hand 53 and the target object 85, the operation planning unit 17A supplies the second operation sequence Srb based on the above-described calculation to the robot control unit 18A.

As a second example of generating the second operation plan, if the trajectories of the modified robot hand 53 and the target object 85 are specified based on the user operation on the instruction device 2, the correction receiving unit 16A supplies the trajectory correction information Ib including the modified trajectory information regarding the robot hand 53 and the target object 85 to the operation planning unit 17A. In this case, the operation planning unit 17A determines whether or not the modified trajectory information regarding the robot hand 53 and the target object 85 identified by the trajectory correction information Ib satisfies the existing constraint conditions (that is, the constraint conditions indicated by the constraint condition information I2). If it satisfies the constraint conditions, the operation planning unit 17A generates the second operation sequence Srb based on the trajectory information, and supplies the second operation sequence Srb to the robot controller 18A.

According to the first example and the second example, the operation planning unit 17A may suitably formulate the second operation plan that is the first operation plan modified so as to realize the state of the object specified by the correction.

The correction mode shown in FIG. 13 is an example. The robot controller 1A may accept various corrections related to the trajectories of the robot hand 53 and the target object 85. For example, the robot controller 1A may accept, as a correction of the posture of the target object 85 in the grasping state, a correction to tilt the posture of the target object 85 from the vertical state by forty-five degrees in the middle of grasping the target object 85, a correction to change the posture of the target object 85 if it reaches the vicinity of the box 86 so as to easily put the target object 85 in the box 86, or the like.

Thus, the robot controller 1A according to the second example embodiment can suitably accept the correction of the position and the posture of a target object, the correction of the point to grasp the object, and the like, and determine the second operation plan in which these corrections are reflected.

Figure 14A:
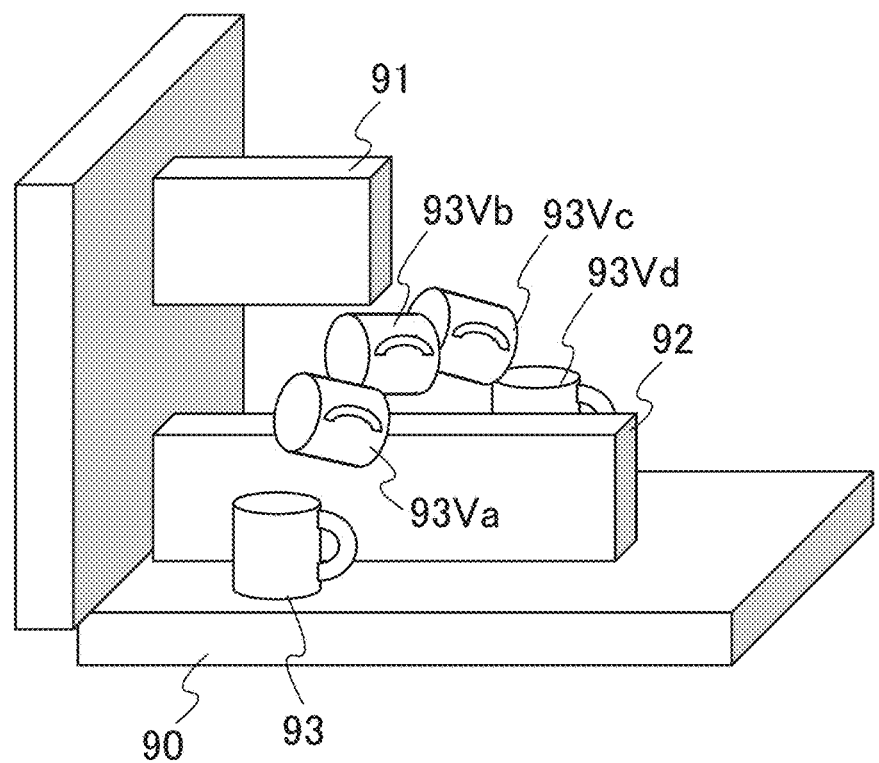
FIG. 14A shows trajectory information before correction in the second example embodiment based on the first viewpoint.
Figure 14B:
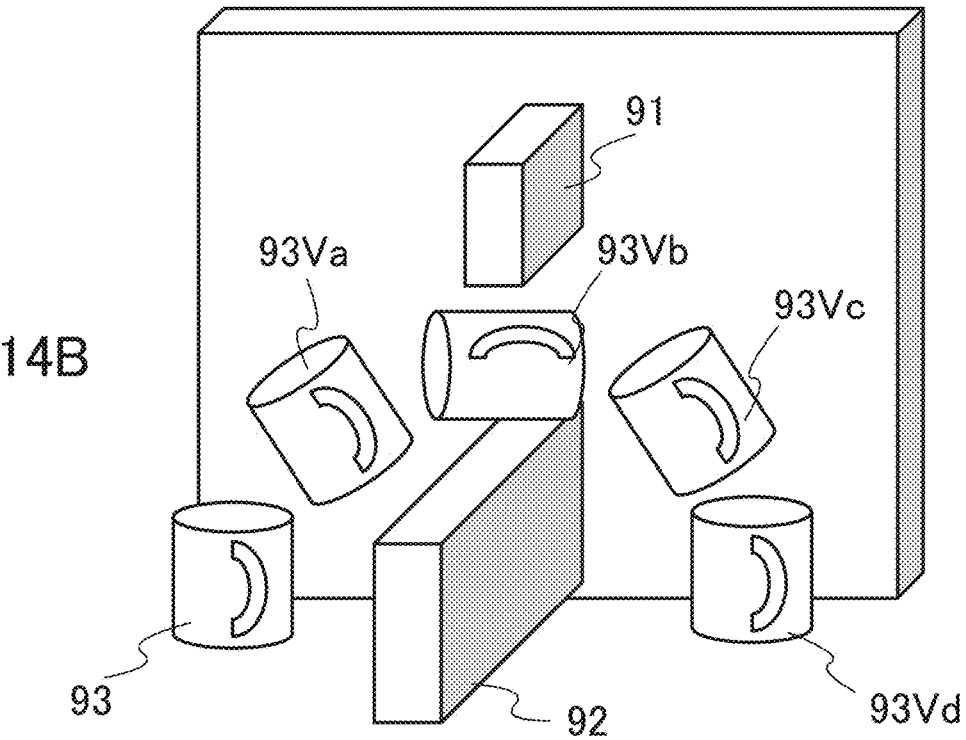
FIG. 14B shows trajectory information before correction in the second example embodiment based on the second viewpoint.

FIG. 14A is a diagram illustrating the trajectory information before correction in the second specific example according to the first viewpoint, and FIG. 14B is a diagram illustrating the trajectory information before correction in the second specific example according to the second viewpoint. Here, the second specific example is a specific example relating to the objective task of moving the target object 93 to a position on the working table 79 behind the first obstacle 91 and the second obstacle 92, and the robot controller 1A displays the trajectory of the target object 93 identified by the first operation plan determined by the operation planning unit 17A. The virtual objects 93Va to 93Vd indicate virtual objects representing the positions and postures of the target object 85 at intervals of a predetermined number of time steps based on the first operation plan. The virtual object 93Vd represents a position and a posture of the target object 93 (that is, the target object 93 present at the target position) at the time of achieving the objective task.

As shown in FIG. 14A and FIG. 14B, in the first operation plan, the trajectory of the target object 93 is set so that the target object 93 passes through the space between the first obstacle 91 and the second obstacle 92. Unfortunately, with such a trajectory, there is a possibility that the robot hand of the robot 5 (not shown) comes into contact with the first obstacle 91 or the second obstacle 92. Thus, the operator determines that it is necessary to correct the trajectory of the target object 93.

Figure 15A:
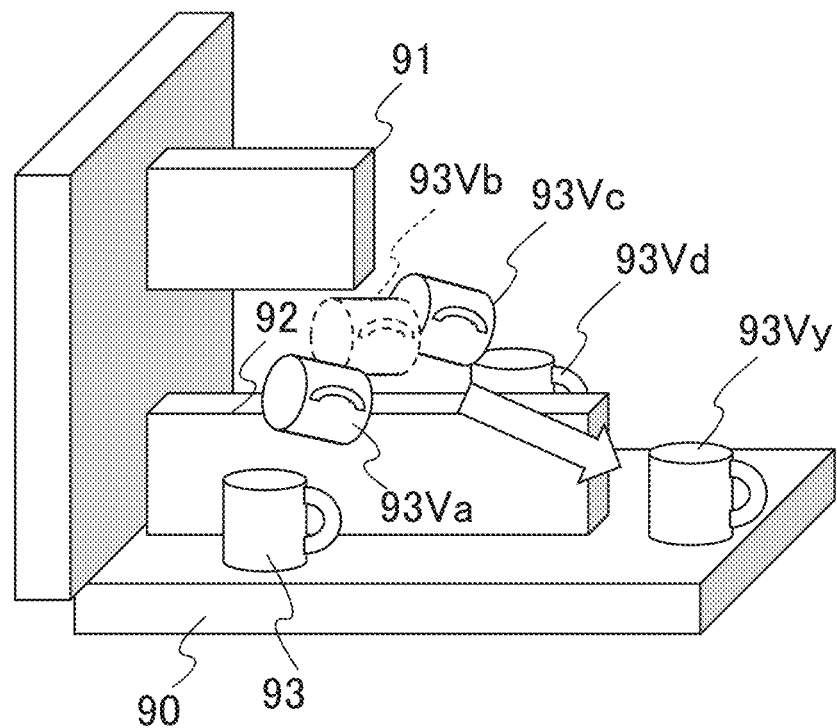
FIG. 15A shows an outline of the operation relating to the correction of the trajectory information in the second example embodiment based on the first viewpoint.
Figure 15B:
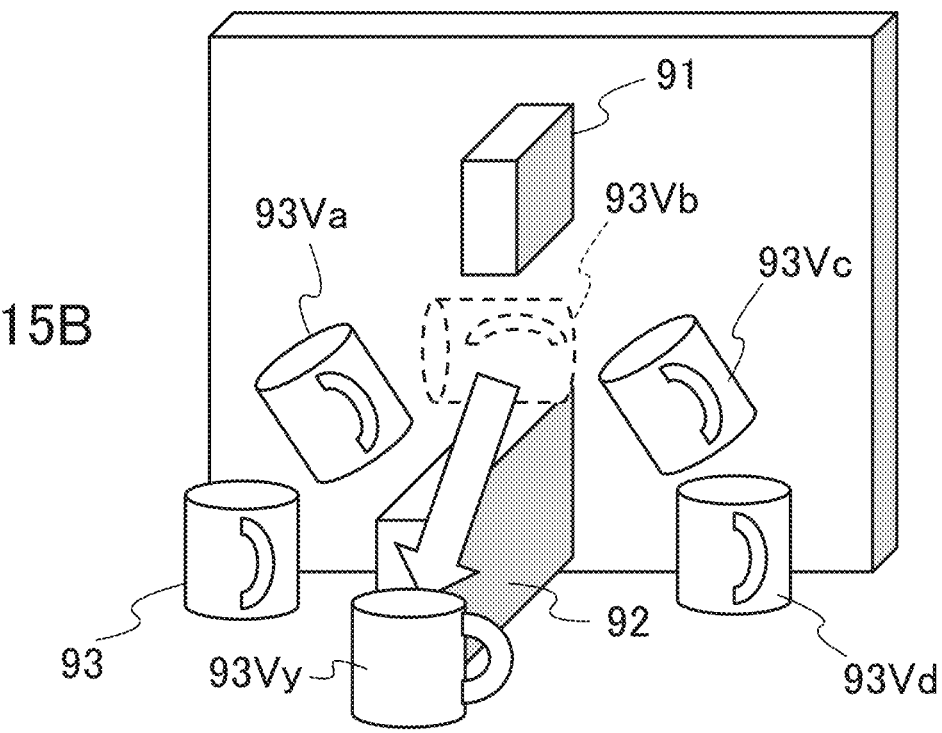
FIG. 15B shows an outline of the operation on the correction of the trajectory information in the second example embodiment based on the second viewpoint.

FIG. 15A is a diagram illustrating an overview of a user operation relating to correction of the trajectory information in the second specific example from a first viewpoint, and FIG. 15B is a diagram illustrating an overview of a user operation relating to correction of the trajectory information in the second specific example from a second viewpoint. In this case, the operator operates the instruction device 2 to correct the trajectory of the target object 93 so as to pass the side of the second obstacle 92 without the target object 93 passing through the space between the first obstacle 91 and the second obstacle 92. Specifically, the operator performs the operation of placing the virtual object 93Vb existing between the first obstacle 91 and the second obstacle 92 at a position beside the second obstacle 92 by drag-and-drop operation. The display control unit 15A newly generates and displays the virtual object 93Vy located at the side of the second obstacle 92 on the basis of the input signal S1 generated by the above-described manipulation. In this instance, the operator adjusts the posture of the virtual object 93Vy such that the target object 93 has a desired posture as well as the position of the target object 93.

The correction receiving unit 16A supplies the trajectory correction information Ib including the information regarding the position and the posture of the virtual object 93Vy to the operation planning unit 17A. In this instance, for example, on the basis of the trajectory correction information Ib, the operation planning unit 17A recognizes such an additional constraint condition that the target object 93 should make the transition to the state of the virtual object 93Vy. Then, based on the additional constraint condition, the operation planning unit 17A performs an optimization process shown in the equation (2) to determine the trajectory of the target object 93 (and the trajectory of the robot 5) after the correction, and the like. If the information on the scheduled operation time (that is, the time step) corresponding to the virtual object 93Vb prior to the change is included in the trajectory correction information Ib, the operation planning unit 17A may set, as the above-described additional constraint condition, such a constraint condition that the target object 93 should make the transition to the state of the virtual object 93Vy at the scheduled operation time.

Figure 16A:
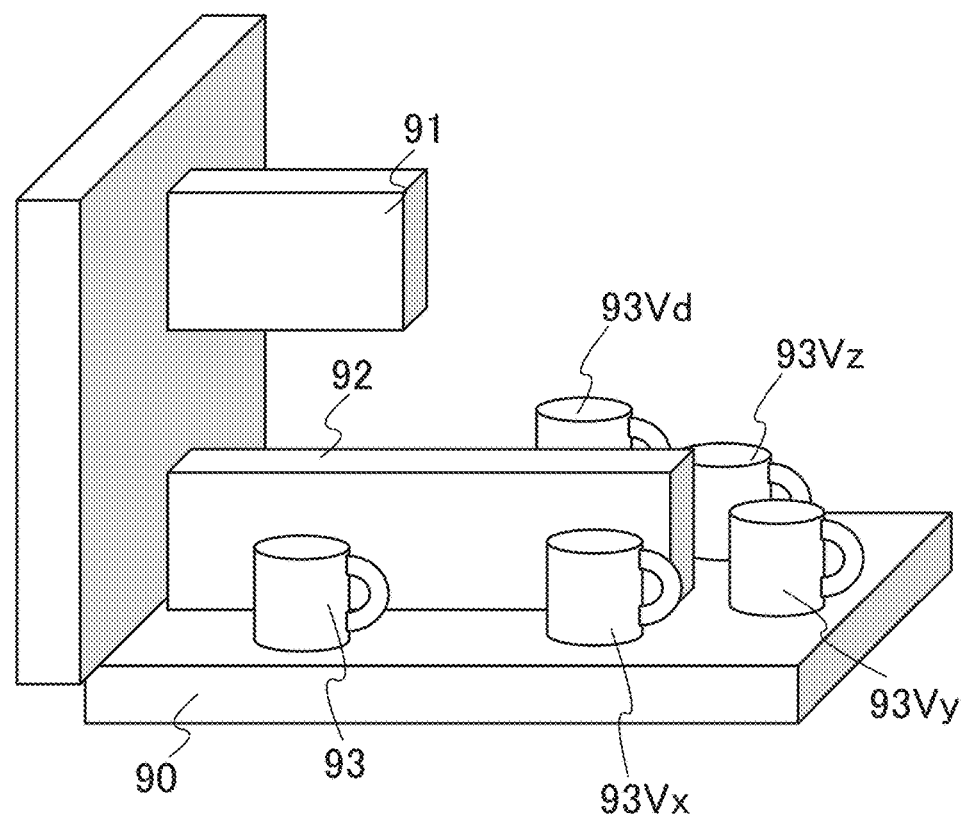
FIG. 16A shows trajectory information after the correction in the second example embodiment based on the first viewpoint.
Figure 16B:
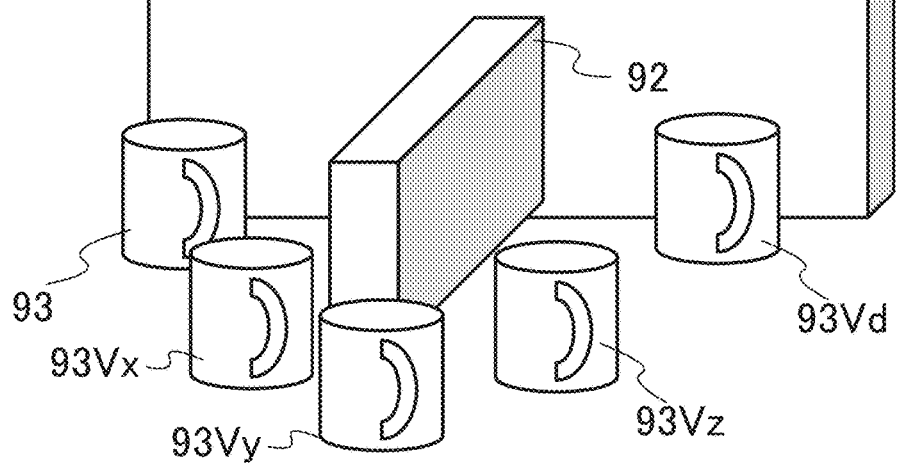
FIG. 16B shows trajectory information after the correction in the second example embodiment based on the second viewpoint.

FIG. 16A is a diagram illustrating the trajectory information based on the second operation plan in the second specific example at the first viewpoint, and FIG. 16B is a diagram illustrating the trajectory information based on the second operation plan in the second specific example at the second viewpoint. In FIG. 16A and FIG. 16B, the virtual objects 93Vx to 93Vz represent the positions and postures of the target object 93 at intervals of the predetermined number of time steps based on the second operation plan.

As shown in FIG. 16A and FIG. 16B, in this case, the display control unit 15A uses the trajectory information based on the second operation plan generated by the operation planning unit 17A to indicate the transition of the target object 93 after the correction by the virtual objects 93Vx to 93Vz, 93Vd. In this case, since making the transition to the state of the virtual object 93Vy is set in the second operation plan as a constraint condition (i.e., subgoal), the trajectory of the target object 93 is appropriately modified so that the target object 93 passes the side of the second obstacle 92. Then, the robot controller 1A can appropriately cause the robot 5 to complete the objective task by controlling the robot 5 based on the second operation plan in this way.

Figure 17:
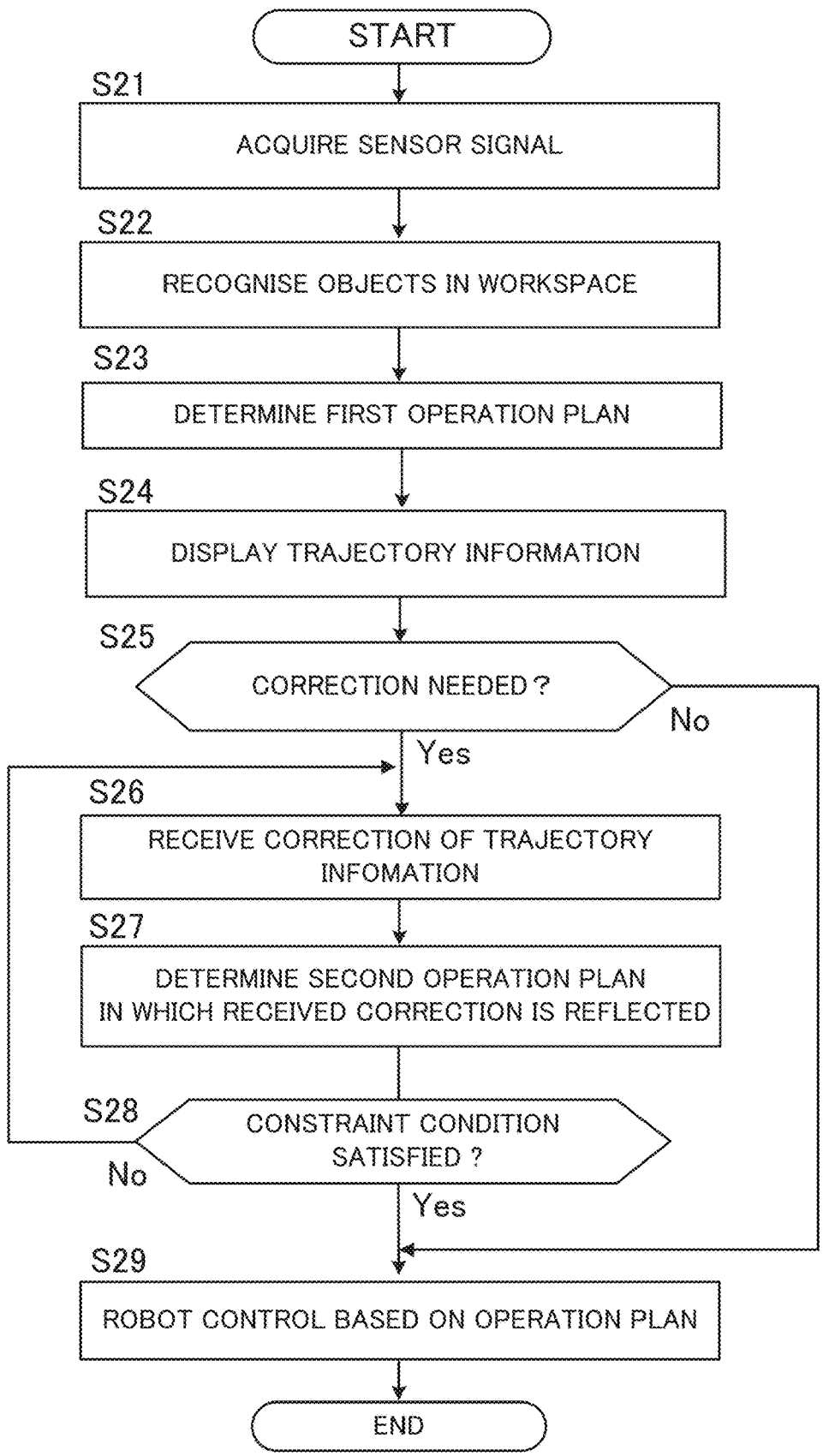
FIG. 17 It is an example of a flowchart showing an outline of the robot control process which the robot controller executes in the second example embodiment.

FIG. 17 is an example of a flowchart illustrating an outline of robot control process that is executed by the robot controller 1 in the second example embodiment.

First, the robot controller 1 acquires the sensor signal S4 from the sensor 7 (step S21). The recognition result acquisition unit 14A of the robot controller 1A recognizes the state (including the position and the posture) and the attribution of each object in the workspace based on the acquired sensor signal S4 (step S22). Furthermore, the recognition result acquisition unit 14A generates the second recognition result Im2 obtained by correcting the first recognition result Im1 based on the same process as in the first example embodiment. In the second example embodiment, the correction process of the first recognition result Im1 based on the same process as in the first example embodiment is not an essential process.

Then, the operation planning unit 17A determines the first operation plan (step S23). Then, the display control unit 15A acquires the trajectory information based on the first operation plan determined by the operation planning unit 17A and causes the instruction device 2 to display the trajectory information (step S24). In this instance, the display control unit 15A displays at least the trajectory information relating to target object(s) on the instruction device 2.

Then, the correction receiving unit 16A determines whether or not the correction of the trajectory data is necessary (step S25). In this instance, the correction receiving unit 16A receives an input that specifies whether or not to correct the trajectory data and determines whether or not to correct the trajectory data based on the received input.

Then, if it is determined that the correction of the trajectory information is necessary (step S25: Yes), the correction receiving unit 16A receives the correction relating to the trajectory information (step S26). In this instance, the correction receiving unit 16A receives the correction based on an arbitrary operating method using the input unit 24a that is an arbitrary user interface provided in the instruction device 2. Then, the operation planning unit 17A determines the second operation plan in which the received correction is reflected, based on the trajectory correction information Ib generated by the correction receiving unit 16A (step S27). Then, the operation planning unit 17A determines whether or not the determined second operation plan satisfies the constraint conditions (step S28). Then, if the second operation plan satisfies the constraint conditions (step S28: Yes), the operation planning unit 17 proceeds with the process at step S29. On the other hand, if the second operation plan does not satisfy the constraint condition (step S28: No), the correction receiving unit 16A considers that the previous correction is invalid and re-receives the correction relating to the trajectory information at step S26. If the second operation plan is determined by the operation planning unit 17A to satisfy the additional constraint condition at step S27, it is determined at step S28 that the second operation plan satisfies the constraint condition.

Then, if the correction of the trajectory data is not necessary (step S25: No), or if it is determined that the constraint condition is satisfied at step S28 (step S28: Yes), the robot control unit 18A performs the robot control on the basis of the second operation sequence Srb based on the second operation plan determined by the operation planning unit 17A (step S29). In this instance, the robot control unit 18A controls the robot 5 to operate according to the generated second operation sequence Srb by sequentially supplying the control signal S3 generated on the basis of the second operation sequence Srb to the robot 5. If the correction of the trajectory information is not necessary, the robot controller 1A uses the first operation plan as the second operation plan and executes the process at step S18.

In the second example embodiment, instead of displaying the trajectory information by augmented reality: the robot controller 1A displays the trajectory information on the instruction device 2 by superimposing the trajectory information on a CG (computer graphics) image or the like schematically representing the workspace to receive corrections relating to the trajectory of the target object and/or the robot 5. Even in this mode, the robot controller 1A can suitably receive the correction of the trajectory information by the operator.

Third Example Embodiment

Figure 18:
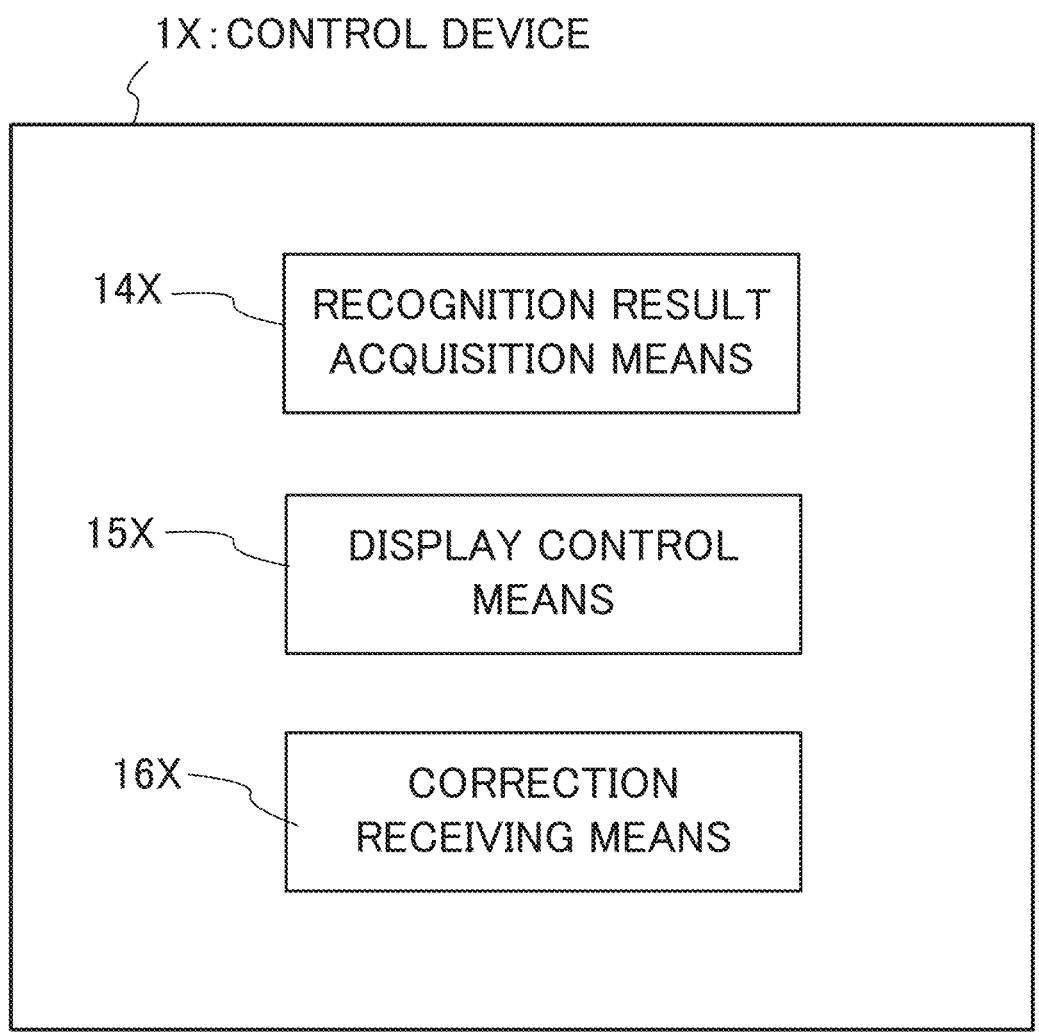
FIG. 18 It shows a schematic configuration of a control device in a third example embodiment.

FIG. 18 shows a schematic configuration diagram of a control device 1X in the third example embodiment. The control device 1X mainly includes a recognition result acquisition means 14X, a display control means 15X, and a correction receiving means 16X. The control device 1X may be configured by a plurality of devices. Examples of the controller 1X include the robot controller 1 in the first example embodiment and the robot controller 1A in the second example embodiment.

The recognition result acquisition means 14X is configured to acquire a recognition result of an object relating to a task to be executed by a robot. The term "object relating to a task" refers to any object relating to a task executed by the robot, and examples thereof include a target object (workpiece) which is grasped or processed by the robot, any other working body, and a robot. The recognition result acquisition means 14X may acquire a recognition result of an object by generating the recognition result of the object based on the information generated by a sensor that senses the environment in which the task is executed, or may acquire a recognition result of an object by receiving the recognition result of the object from an external device that generates the recognition result. Examples of the recognition result acquisition means 14X in the former case include the recognition result acquisition unit 14 in the first example embodiment or the recognition result acquisition unit 14A in the second example embodiment.

The display control means 15X is configured to display information representing the recognition result to be visually recognized in a state where the information overlaps with an actual scene or an image of the scene. The term "scene" refers to the workspace in which the task is executed. The display control means 15X may be implemented as a display device configured to display information by itself, or may be a device configured to display information by transmitting a display signal to an external display device. Examples of the display control means 15X include the display control unit 15A in the first example embodiment and the display control unit 15 in the second example embodiment.

The correction receiving means 16X is configured to receive a correction of the recognition result based on an external input. Examples of the correction receiving means 16X include the correction receiving unit 16 in the first example embodiment and the correction receiving unit 16A in the second example embodiment.

Figure 19:
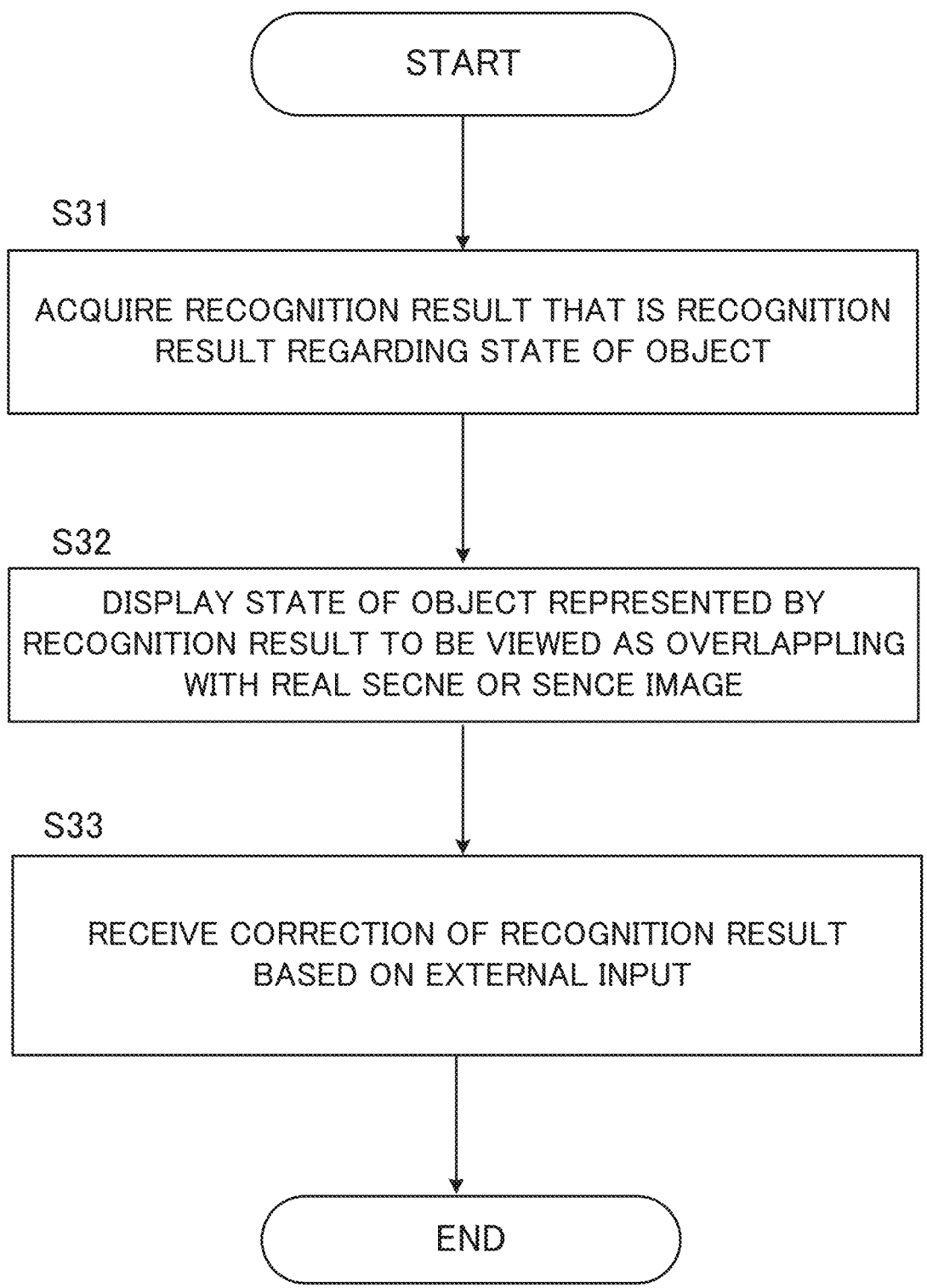
FIG. 19 It is an example of a flowchart executed by the control device in the third example embodiment.

FIG. 19 is an example of a flowchart in the third example embodiment. The recognition result acquisition means 14X acquires a recognition result of an object relating to a task to be executed by a robot (step S31). The display control means 15X displays information representing the recognition result to be visually recognized in a state where the information overlaps with an actual scene or an image of the scene (step S32). Then, the correction receiving means 16X receives a correction of the recognition result based on an external input (step S33).

According to the third example embodiment, the control device 1X suitably receives the correction of the recognition result of an object regarding a task to be executed by the robot, and can obtain the accurate recognition result based on the correction.

Fourth Example Embodiment

Figure 20:
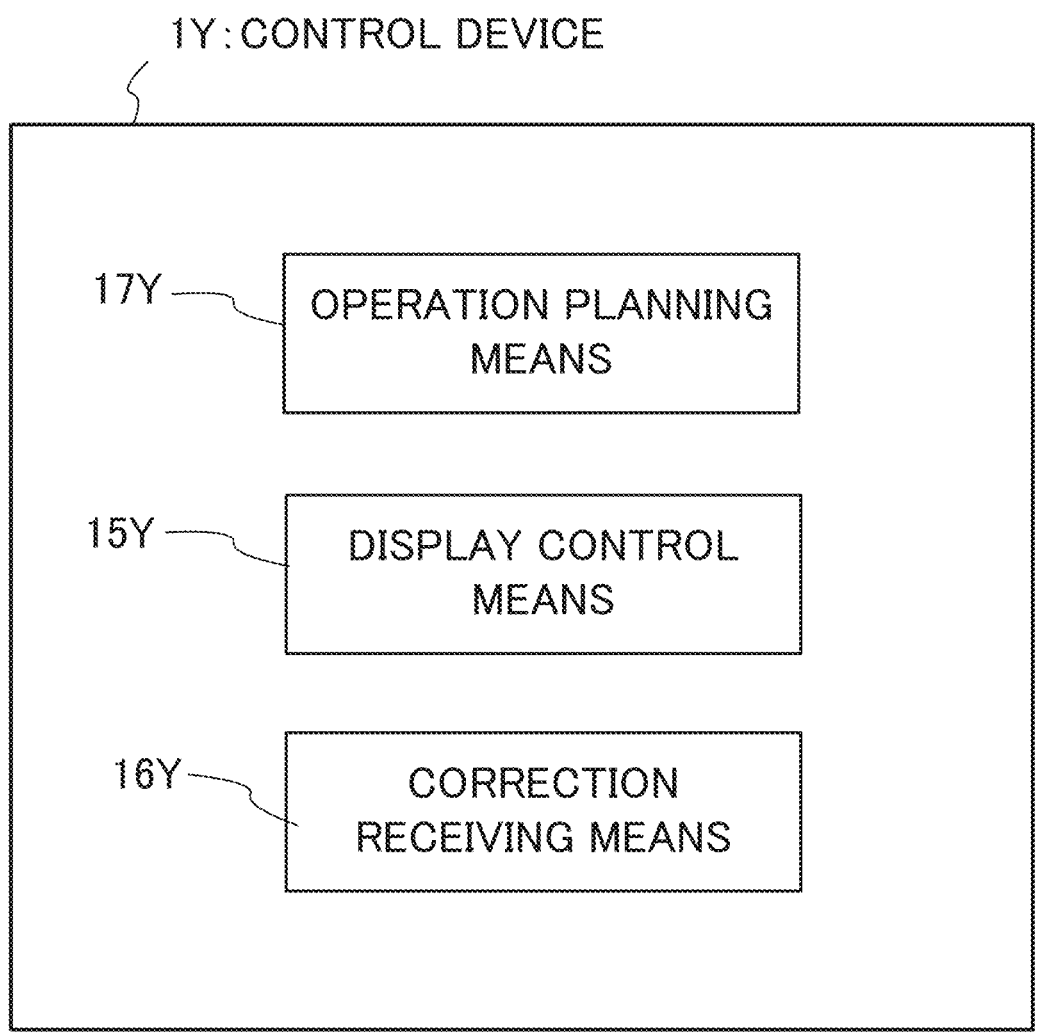
FIG. 20 It shows a schematic configuration of the control device in a fourth example embodiment.

FIG. 20 shows a schematic configuration diagram of a control device 1Y in the fourth example embodiment. The control device 1Y mainly includes an operation planning means 17Y, a display control means 15Y, and a correction receiving means 16Y. The control device 1Y may be configured by a plurality of devices. Examples of the control device 1X include the robot controller 1 in the first example embodiment.

The operation planning mean 17Y is configured to determine a first operation plan of a robot which executes a task in which an object is used. The operation planning means 17Y is configured to determine a second operation plan of the robot based on a correction received by the correction receiving means 16Y, which will be described later. Examples of the operation planning means 17Y include the operation planning unit 17A in the second example embodiment.

The display control means 15Y is configured to display trajectory information regarding a trajectory of the object based on the first operation plan. The display control means 15Y may be implemented as a display device configured to display information by itself, or may be a device configured to display information by transmitting a display signal to an external display device. Examples of the display control means 15Y include the display control unit 15A in the second example embodiment.

The correction receiving means 16Y is configured to receive the correction relating to the trajectory information based on an external input. Examples of the correction receiving means 16Y include the correction receiving unit 16A in the second example embodiment.

Figure 21:
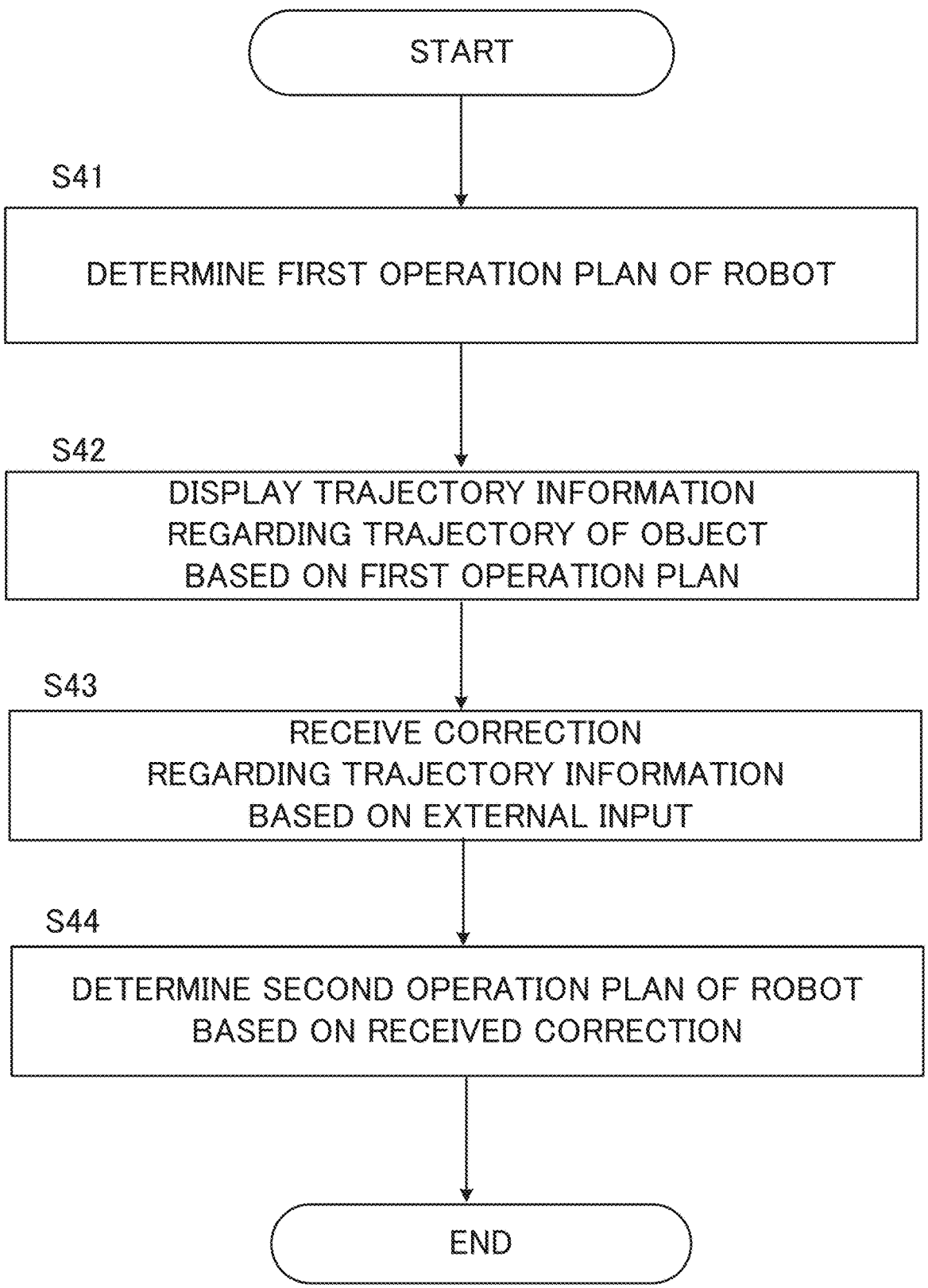
FIG. 21 It shows an example of a flowchart executed by the control device in the fourth example embodiment.

FIG. 21 is an example of a flowchart in the fourth example embodiment. The operation planning means 17Y determines a first operation plan of a robot which executes a task in which an object is used (step S41). The display control means 15Y displays trajectory information regarding a trajectory of the object based on the first operation plan (step S42). The correction receiving means 16Y receives a correction relating to the trajectory information based on an external input (step S43). Then, the operation planning means 17Y determines a second operation plan of the robot based on the correction received by the correction receiving means 16Y (step S44).

According to the fourth example embodiment, the control device 1X displays the trajectory information regarding the trajectory of the object based on the determined operation plan of the robot, and suitably receives the correction and reflects it in the operation plan.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

[Supplementary Note 1]

A control device comprising:
  a recognition result acquisition means configured to acquire a recognition result of an object relating to a task to be executed by a robot;
  a display control means configured to display information representing the recognition result to be visually recognized in a state where the information overlaps with an actual scene or an image of the scene: and
  a correction receiving means configured to receive a correction of the recognition result based on an external input.

[Supplementary Note 2]

The control device according to Supplementary Note 1,
  wherein the display control means is configured to display a virtual object, which represents the object, to be visually recognized in a state where the virtual object overlaps with the object in the scene or the image, based on the recognition result.

[Supplementary Note 3]

The control device according to Supplementary Note 2,
  wherein the correction receiving means is configured to receive the correction relating to at least one of a position and/or a posture of the object, based on the external input of modifying at least one of the position and/or the posture of the virtual object.

[Supplementary Note 4]

The control device according to Supplementary Note 2 or 3,
  wherein the correction receiving means is configured to receive the correction indicating deletion of the recognition result regarding the object corresponding to the virtual object, based on the external input of providing instruction on deletion of the virtual object.

[Supplementary Note 5]

The control device according to any one of Supplementary Notes 2 to 4,
  wherein the correction receiving means is configured to receive the correction indicating addition of the recognition result regarding the object corresponding to the virtual object, based on the external input of providing instruction on addition of the virtual object.

[Supplementary Note 6]

The control device according to any one of Supplementary Notes 1 to 5,
  wherein the display control means is configured to display information regarding an attribute of the object included in the recognition result in association with the object in the scene or the image, and
  wherein the correction receiving means is configured to receive the correction relating to the attribute based on the external input of providing instruction on changing the attribute.

[Supplementary Note 7]

The control device according to any one of Supplementary Notes 1 to 6,
  wherein the recognition result includes a confidence degree representing a degree of confidence regarding correctness of the recognition of the object, and
  wherein the correction receiving means is configured to determine whether or not the correction is necessary, based on the confidence degree.

[Supplementary Note 8]

The control device according to any one of Supplementary Notes 1 to 7, wherein the recognition result includes a confidence degree representing a degree of confidence regarding correctness of the recognition of the object, and wherein the display control means is configured to determine a display mode of the information representing the recognition result, based on the confidence degree.

[Supplementary Note 9]

The control device according to Supplementary Note 8, wherein the display control means is configured to highlight and display the information representing the recognition result whose confidence degree is smaller than a threshold value.

[Supplementary Note 10]

The control device according to any one of Supplementary Notes 1 to 9, further comprising an operation planning means configured to determine an operation plan of the robot based on a second recognition result in which the correction of the recognition result is reflected.

[Supplementary Note 11]

The control device according to Supplementary Note 10, wherein the operation planning means is configured to comprise:

a logical formula conversion means configured to convert the task to be executed by the robot into a logical formula based on a temporal logic;

a time step logical formula generation means configured to generate a time step logical formula that is a logical formula indicating state for each time step to execute the task: and a subtask sequence generation means configured to generate a sequence of subtasks to be executed by the robot, based on the time step logical formula.

[Supplementary Note 12]

A control method executed by a computer, the control method comprising:

acquiring a recognition result of an object relating to a task to be executed by a robot;

displaying information representing the recognition result to be visually recognized in a state where the information overlaps with an actual scene or an image of the scene: and receiving a correction of the recognition result based on an external input.

[Supplementary Note 13]

A storage medium storing a program executed by a computer, the program causing the computer to:

acquire a recognition result of an object relating to a task to be executed by a robot;

display information representing the recognition result to be visually recognized in a state where the information overlaps with an actual scene or an image of the scene; and receive a correction of the recognition result based on an external input.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various corrections that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A Robot controller
1X, 1Y Control device
2 Instruction device
4 Storage device
5 Robot
7 Sensor
41 Application information storage unit
100 Robot control system

What is claimed is:

1. A control device comprising:
at least one memory configured to store instructions; and
at least one processor configured to execute the instructions to:
acquire a recognition result of an object relating to a task to be executed by a robot, wherein the recognition result includes a confidence degree as a degree of confidence regarding correctness of the recognition of the object;
determine whether or not a correction is necessary, based on the confidence degree;
upon determining that the correction is necessary, display information, for receiving the correction of the recognition result based on an external input, representing the recognition result to be visually recognized in a state where the information overlaps with an actual scene or an image of the scene; and
receive the correction based on the external input.

2. The control device according to claim 1, wherein the at least one processor is configured to execute the instructions to display a virtual object, which represents the object, to be visually recognized in a state where the virtual object overlaps with the object in the scene or the image, based on the recognition result.

3. The control device according to claim 2, wherein the at least one processor is configured to execute the instructions to receive the correction relating to at least one of a position and/or a posture of the object, based on the external input of modifying at least one of the position and/or the posture of the virtual object.

4. The control device according to claim 2, wherein the at least one processor is configured to execute the instructions to receive the correction indicating deletion of the recognition result regarding the object corresponding to the virtual object, based on the external input of providing instruction on deletion of the virtual object.

5. The control device according to claim 2, wherein the at least one processor is configured to execute the instructions to receive the correction indicating addition of the recognition result regarding the object corresponding to the virtual object, based on the external input of providing instruction on addition of the virtual object.

6. The control device according to claim 1, wherein the at least one processor is configured to execute the instructions to display information regarding an attribute of the object included in the recognition result in association with the object in the scene or the image, and wherein the at least one processor is configured to execute the instructions to receive the correction relating to the attribute based on the external input of providing instruction on changing the attribute.

7. The control device according to claim 1,
wherein the at least one processor is configured to execute the instructions to determine a display mode of the information representing the recognition result, based on the confidence degree.

8. The control device according to claim 7,
wherein the at least one processor is configured to execute the instructions to highlight and display the information representing the recognition result whose confidence degree is smaller than a threshold value.

9. The control device according to claim 1,
wherein the at least one processor is configured to further execute the instructions to determine an operation plan of the robot based on a second recognition result in which the correction of the recognition result is reflected.

10. The control device according to claim 9,
wherein the at least one processor is configured to execute the instructions to:
convert the task to be executed by the robot into a logical formula based on a temporal logic;
generate a time step logical formula that is a logical formula indicating state for each time step to execute the task; and
generate a sequence of subtasks to be executed by the robot, based on the time step logical formula.

11. A control method executed by a computer, the control method comprising:
acquiring a recognition result of an object relating to a task to be executed by a robot, wherein the recognition result includes a confidence degree as a degree of confidence regarding correctness of the recognition of the object;
determining whether or not a correction is necessary, based on the confidence degree;
upon determining that the correction is necessary, displaying information, for receiving the correction of the recognition result based on an external input, representing the recognition result to be visually recognized in a state where the information overlaps with an actual scene or an image of the scene; and
receiving the correction based on the external input.

12. A non-transitory computer readable storage medium storing a program executed by a computer, the program causing the computer to:
acquire a recognition result of an object relating to a task to be executed by a robot, wherein the recognition result includes a confidence degree as a degree of confidence regarding correctness of the recognition of the object;
determine whether or not a correction is necessary, based on the confidence degree;
upon determining that the correction is necessary, display information, for receiving the correction of the recognition result based on an external input, representing the recognition result to be visually recognized in a state where the information overlaps with an actual scene or an image of the scene; and
receive the correction based on the external input.

13. The control device according to claim 6,
wherein the attribute of the object is classified in accordance with a type of the task and
wherein the at least one processor is configured to execute the instructions to display the information regarding the attribute classified in accordance with the type of the task.

14. The control device according to claim 1,
wherein the at least one processor is configured to determine that the correction is necessary upon determining that the confidence degree is lower than a predetermined threshold value.

* * * * *